United States Patent
Ben-Nun et al.

(10) Patent No.: US 10,986,513 B2
(45) Date of Patent: *Apr. 20, 2021

(54) SUPERVISION OF DATA IN A WIRELESS NETWORK

(71) Applicant: Vasona Networks Inc., Austin, TX (US)

(72) Inventors: Michael Ben-Nun, Ramat-Hasharon (IL); Ofer Weill, Modiin (IL); Roni Bar Yanai, Even-Yehuda (IL)

(73) Assignee: Vasona Networks, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/442,167

(22) Filed: Jun. 14, 2019

(65) Prior Publication Data

US 2019/0297509 A1    Sep. 26, 2019

Related U.S. Application Data

(63) Continuation of application No. 14/077,628, filed on Nov. 12, 2013, now Pat. No. 10,341,881.

(51) Int. Cl.
*H04W 24/00* (2009.01)
*H04W 24/02* (2009.01)
*H04W 88/08* (2009.01)

(52) U.S. Cl.
CPC ........... *H04W 24/00* (2013.01); *H04W 24/02* (2013.01); *H04W 88/08* (2013.01)

(58) Field of Classification Search
CPC .................................................. H04L 43/0864
See application file for complete search history.

(56) References Cited

U.S. PATENT DOCUMENTS

2009/0310500 A1* 12/2009 Matsuda ............. H04L 43/0864
                                                                370/252
2015/0043346 A1*  2/2015 Miller .................. H04L 47/122
                                                                370/234

OTHER PUBLICATIONS

Notice of Allowance dated May 31, 2019, filed in U.S. Appl. No. 14/077,628, pp. 1-2.
Notice of Allowance dated Mar. 20, 2019, filed in U.S. Appl. No. 14/077,628, pp. 3-5.
Notice of Allowance dated Feb. 14, 2019, filed in U.S. Appl. No. 14/077,628, pp. 6-14.

(Continued)

*Primary Examiner* — Kevin M Cunningham

(57) ABSTRACT

Examples of methods, systems, and computer program products relating to supervising data in a wireless network are disclosed. At least part of a system may be located between a packet data network and a base station, and/or may be at least logically separate from the base station. The system may be capable of evaluating the service provided by the base station, and may be capable of determining whether or not any action should consequently be performed. Examples of an action may include an action which may not necessarily affect en-route data packets such as outputting a report, and/or an action which may affect en-route data packets such as delaying packets, not delaying packets, and/or stopping the delaying of packets. An action which affects data packets may or may not affect data packets uniformly. An action may or may not result in an improvement in quality of user experience.

9 Claims, 7 Drawing Sheets

(56) References Cited

OTHER PUBLICATIONS

Response to Non-Final Office Action dated Jan. 4, 2019, filed in U.S. Appl. No. 14/077,628, pp. 15-23.
Non-Final Rejection dated Sep. 4, 2018, filed in U.S. Appl. No. 14/077,628, pp. 24-32.
Request for Continued Examination dated Apr. 30, 2018, filed in U.S. Appl. No. 14/077,628, pp. 33-45.
Final Rejection dated Jan. 30, 2018, filed in U.S. Appl. No. 14/077,628, pp. 46-57.
Amendment/Request for Reconsideration after Non-Final Rejection dated Oct. 30, 2017, filed in U.S. Appl. No. 14/077,628, pp. 58-65.
Non-Final Rejection dated Jul. 31, 2017, filed in U.S. Appl. No. 14/077,628, pp. 66-75.
Request for Continued Examination dated Feb. 6, 2017, filed in U.S. Appl. No. 14/077,628, pp. 76-86.
Final Rejection dated Nov. 4, 2016, filed in U.S. Appl. No. 14/077,628, pp. 87-97.
Amendment/Request for Reconsideration after Non-Final Rejection dated Jul. 20, 2016, filed in U.S. Appl. No. 14/077,628, pp. 98-104.
Non-Final Rejection dated Apr. 25, 2016, filed in U.S. Appl. No. 14/077,628, pp. 105-113.
Request for Continued Examination dated Jan. 27, 2016, filed in U.S. Appl. No. 14/077,628, pp. 114-122.
Amendment/Request for Reconsideration after Non-Final Rejection dated Oct. 8, 2017, filed in U.S. Appl. No. 14/077,628, pp. 123-128.
Non-Final Rejection dated Jul. 15, 2015, filed in U.S. Appl. No. 14/077,628, pp. 129-136.

\* cited by examiner

SUPERVISION OF DATA IN A WIRELESS NETWORK

TECHNICAL FIELD

The disclosure relates to wireless networks.

BACKGROUND

A wireless network may be used to provide wireless data services to a user (also referred to as a subscriber). Data may be transferred between a packet data network (PDN) and a user equipment (UE) associated with a user via a base station. Each base station may service one or more groups served by one or more wireless transmitters. At any point in time, each group may include zero or any number of UEs. For example, at a particular point in time a certain base station may service 1 group, 3 groups or 6 groups, with each group including zero or any number of UEs (e.g. tens of UEs).

Examples of a wireless network may include a mobile network, a Wi-Fi network, and/or any other type of wireless network. In a mobile network with a core network of Universal Mobile Telecommunications System (UMTS) architecture, a base station may additionally or alternatively be referred to as a NodeB. In a mobile network with a core network of Long Term Evolution architecture (LTE) a base station may additionally or alternatively be referred to as an eNodeB. In a mobile network with a core network of Global System for Mobile Communications (GSM), Code Division Multiple Access (CDMA), or Code Division Multiple Access 2000 (CDMA 2000), a base station may additionally or alternatively be referred to as a base transceiver station or radio base station. In a network, a base station may additionally or alternatively be referred to as an access point or wireless access point.

SUMMARY

In accordance with the presently disclosed subject matter, there is provided a method of supervising data in a wireless network, comprising: noting times associated with data packets en route between a packet data network and a base station; at least partly based on one or more of the noted times, evaluating the service provided by the base station; at least partly based on a result of the evaluating, determining whether or not at least one action should be performed; and if determined that any action should be performed, performing at least one action.

In some examples of the method, the evaluating includes: estimating at least one parameter at least partly based on one or more of the noted times.

In some cases of these examples, at least one of the at least one parameter is indicative of base station queuing time.

In some cases of these examples, at least one of the at least one parameter is a round trip time or adjusted round trip time.

In some cases of these examples, at least one of the at least one parameter is a base station outgoing rate.

In some examples of the method, at least one of the at least one action is performed in order to reduce the fullness of at least one queue in the base station.

In accordance with the presently disclosed subject matter, there is provided a system for supervising data in a wireless network, comprising: a noter configured to note times associated with data packets en route between a packet data network and a base station; an evaluator configured, at least partly based on one or more of the noted times, to evaluate the service provided by the base station, and configured, at least partly based on a result of the evaluating, to determine whether or not at least one action should be performed; and an action performer delayer configured, if determined that any action should be performed, to perform at least one action.

In some examples, the system further comprises: a data structure in which the noter is configured to store times associated with data packets.

In some examples, the system further comprises: a recognizer configured to recognize characteristics of data packets.

In some examples, the system further comprises: a handler configured to intercept and forward data packets.

In some examples of the system, at least part of the system is located in the wireless network between a packet data network and one or more base stations.

In some examples of the system, at least one of the at least one action is performed in order to reduce the fullness of at least one queue in the base station.

In accordance with the presently disclosed subject matter, there is provided a computer program product comprising a computer useable medium having computer readable code embodied therein for supervising data in a wireless network, the computer program product comprising: computer readable program code for causing a computer to note times associated with data packets en route between a packet data network and a base station; computer readable program code for causing a computer, at least partly based on one or more of the noted times, to evaluate the service provided by the base station; computer readable program code for causing a computer, at least partly based on a result of the evaluating, to determine whether or not at least one action should be performed; and computer readable program code for causing a computer, if determined that any action should be performed, to perform at least one action.

In some examples of the computer program product, at least one of the at least one action is performed in order to reduce the fullness of at least one queue in the base station.

BRIEF DESCRIPTION OF THE DRAWINGS

In order to understand the subject matter and to see how it may be carried out in practice, some examples will be described, with reference to the accompanying drawings, in which.

Figure 1:
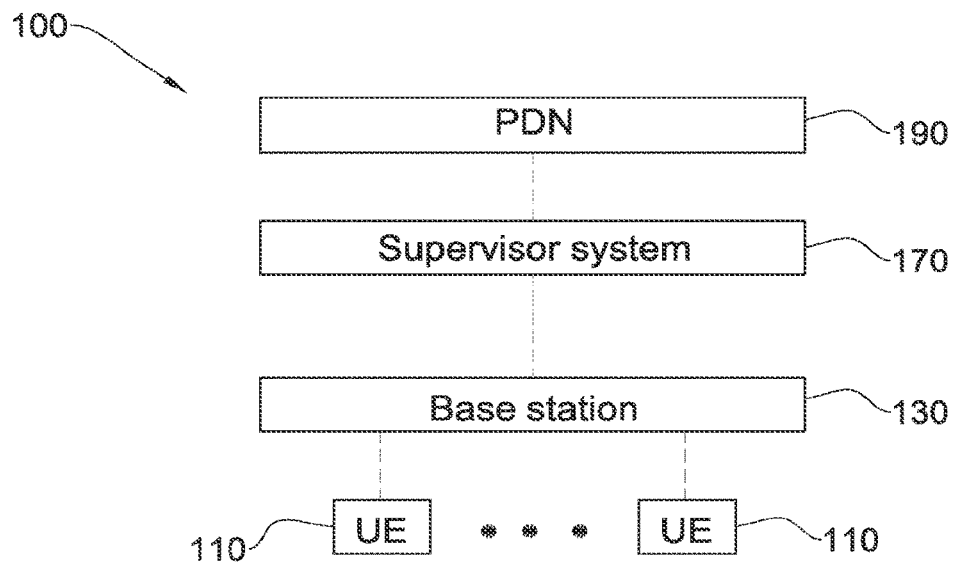
FIG. 1 is a block diagram of an example of a wireless network, in accordance with the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical or analogous elements.

DETAILED DESCRIPTION OF THE DRAWINGS

Examples of methods, systems, and computer program products relating to supervising data in a wireless network are disclosed. At least part of a system may be located between a packet data network and a base station, and/or may be at least logically separate from the base station. The system may be capable of evaluating the service provided by the base station, and may be capable of determining whether or not any action should consequently be performed. Examples of an action may include an action which may not necessarily affect en-route data packets such as outputting a report, and/or an action which may affect en-route data packets such as delaying packets, not delaying packets, and/or stopping the delaying of packets. An action which affects data packets may or may not affect data packets uniformly. An action may or may not result in an improvement in quality of user experience.

In the description herein, numerous specific details are set forth in order to provide a thorough understanding of the subject matter. However, it will be understood by those skilled in the art that some examples of the subject matter may be practiced without these specific details. In other instances, well-known features, structures, characteristics, stages, methods, modules, elements, entities or systems have not been described in detail so as not to obscure the subject matter.

Usage of the term "typically although not necessarily", "although not necessarily so" "such as", "e.g.", "possibly", "it is possible" "it may be possible", "optionally", "say", "for example," "for instance", "an example" "one example", "illustrated example", "some examples", "another example", "other examples, "various examples", "examples", "instances", "one instance", "some instances", "another instance", "other instances", "one case", "some cases", "another case", "other cases", "cases", or variants thereof means that a particular described feature, structure, characteristic, stage, method, module, element, entity, or system is included in at least one example of the subject matter, but not necessarily in all examples. The appearance of the same term does not necessarily refer to the same example(s).

The term " illustrated example", is used to direct the attention of the reader to one or more of the figures, but should not be construed as necessarily favoring any example over any other.

Usage of conditional language, such as "may", "can", "could", or variants thereof should be construed as conveying that one or more examples of the subject matter may include, while one or more other examples of the subject matter may not necessarily include, certain features, structures, stages, methods, modules, elements, entities or systems. Thus such conditional language is not generally intended to imply that a particular described feature, structure, stage, method, module, element, entity or system is necessarily included in all examples of the subject matter.

The term "non-transitory" is used to exclude transitory, propagating signals, but to otherwise include any volatile or non-volatile computer memory technology suitable to the application.

It should be appreciated that certain features, structures, characteristics, stages, methods, modules, elements, entities or systems disclosed herein, which are, for clarity, described in the context of separate examples, may also be provided in combination in a single example. Conversely, various features, structures, characteristics, stages, methods, modules, elements, entities or systems disclosed herein, which are, for brevity, described in the context of a single example, may also be provided separately or in any suitable sub-combination.

Usage of terms such as "observing", "estimating", "comparing", "determining", "outputting", "reporting", "evaluating", "noting", "performing", "recognizing", "handling", "dropping", "updating", "adjusting", "delaying", "stopping", "checking", "waiting", "causing", "removing", "placing", "storing", "intercepting", "forwarding", "executing", "implementing", or the like, may refer to the action(s) and/or process(es) of a system such as any of the system(s) described below, or a part thereof.

Referring now to the figures in more detail, FIG. 1 is a block diagram of an example of a wireless network 100, in accordance with the presently disclosed subject matter.

In the illustrated example, wireless network 100 may include one or more packet data network(s) (PDN) 190, one or more base station(s) 120, one or more supervisor system(s) 170 and one or more user equipment(s) (UE) 130. The dashed lines between elements 190, 170, 130 and 110, signify that there may be intervening element(s) between elements illustrated in FIG. 1, but for simplicity's sake, such intervening element(s) may not be described with reference to FIG. 1. Each base station 130 may service one or more groups served by one or more wireless transmitters and therefore may service at any point in time zero or more UE(s) 110. The subject matter does not limit the location of any supervisor 170, but optionally at least part of each supervisor 170 may be located in a location between one or more PDN(s) 190 and one or more base station(s) 130, and/or optionally at least part of each supervisor 170 may be in the same location as one or more base station(s) 130 but at least logically separate from base station(s) 130. Such a location may possibly enable supervisor 170 to supervise data packets en route in one or either direction between any of PDN(s) 190 and any of base station(s) 130.

For simplicity of illustration and description, a single element is illustrated in FIG. 1 and described herein for each of PDN 190, supervisor 170, and base station 130, but in some examples network 100 may include a plurality of elements of one or more of these types.

Wireless network 100 may be any type of wireless network, such as a mobile network, a network, another type of wireless network, a combination of any of the above, etc. If at least part of wireless network 100 is a mobile network, the mobile network may include a core network of any architecture such as UMTS, GSM, LTE, CDMA, CDMA2000, any network of any appropriate generation, etc.

PDN 190 may be any type of packet data network. For instance, PDN 190 may be the Internet, and/or any other public and/or private packet data network.

Supervisor system 170 may be made up of any combination of software, hardware and/or firmware that performs the function(s) as described and explained herein, including for instance supervision of data in mobile network 100. For example, supervisor system 170 or any part thereof may include a computer. The term computer in the single form herein should be construed to cover a single computer and/or a plurality of computers and the term computer should be broadly construed to cover any combination of hardware, software and/or firmware, the combination including at least some hardware and having capabilities which include data processing capabilities. For example, a computer may be specially constructed for the desired purposes, and/or a computer may be selectively activated and/or reconfigured by specially constructed program code.

Depending on the instance, supervisor 170 may be centralized in one location (e.g. including one or more units at that location), or supervisor 170 may be dispersed over more than one location in mobile network 100. Therefore even in cases where at least part of supervisor 170 may be located between base station 130 and PDN 190 and/or in the same location as base station 130 but logically separate, it is possible that another part of supervisor 170 may be located elsewhere.

User equipment 110 may be any type of user equipment configured to access PDN 190 via base station 130. An example of user equipment 110 may include a Smartphone, feature phone, a tablet, a PC ("personal computer") connecting via a USB dongle, etc.

Base station 130 may be any type of base station associated with any architecture (e.g. NodeB in UMTS, eNodeB in LTE; base transceiver station/radio base station in GSM, CDMA, or CDMA2000; access point/wireless access point etc). For instance, base station 130 may include one or more transmitters/receiver(s), one or more antenna(s) and/or one or more other element(s).

Typically although not necessarily, data packets arriving at base station 130 from PDN 190 may be placed in one or more queue(s) in base station 130. Typically although not necessarily, base station 130 may be configured to schedule the provision of data packets, destined for UEs 110 which "compete" for service, among these UEs 110. The scheduling of data packets may typically although not necessarily be in accordance with a proprietary scheduling algorithm. For instance, one scheduling algorithm may aim to maximize throughput per base station 130 (or if base station 130 services more than one group served by more than one wireless transmitter, then additionally or alternatively per group). Throughput may be affected by the amount of overhead and/or retransmitted packets, where the amount of overhead and/or retransmitted packets may be dependent for instance on any of reception conditions, interference, the scheduling algorithm etc. Possibly a scheduling algorithm which favors UE(s) 110 with the best reception conditions rather than ignoring reception conditions when scheduling data packets may result in a higher throughput. Additionally or alternatively, another scheduling algorithm may be proportionally fair by aiming to maximize throughput but allowing all competing UEs 110 at least a minimal level of service. The subject matter is not bound by any particular scheduling algorithm.

Figure 2:
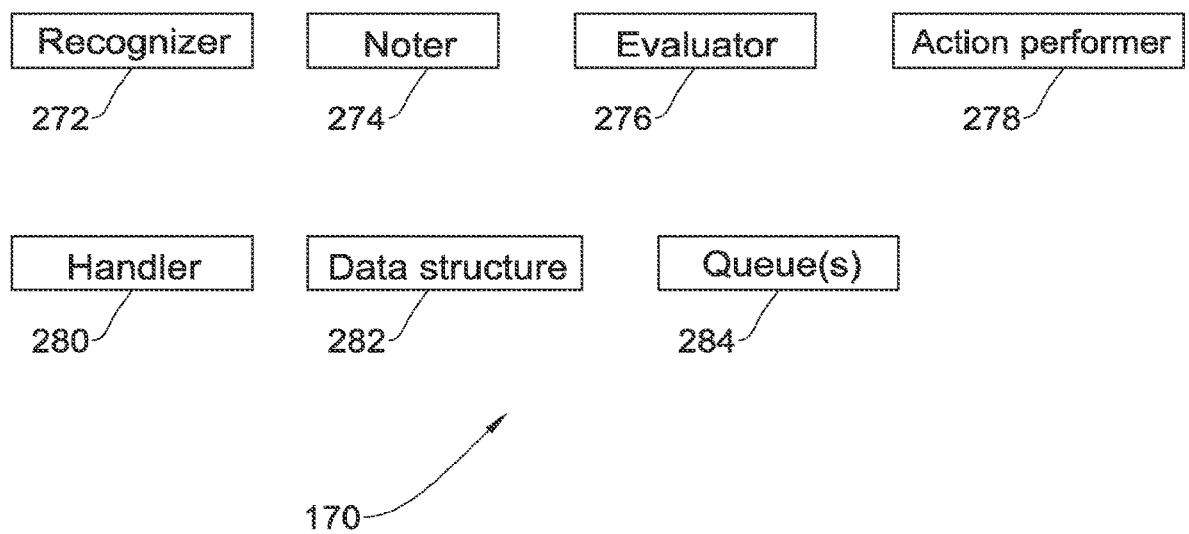
FIG. 2 is a block diagram of an example of a supervisor system, in accordance with the presently disclosed subject matter.

FIG. 2 is a block diagram of an example of a supervisor system 170, in accordance with the presently disclosed subject matter.

Depending on the example, supervisor 170 may be configured to supervise data in a manner which may vary between very passive to very active.

In the illustrated example, supervisor 170 may include a noter module 274, an evaluator module 276, an action performer module 278, and optionally a recognizer module 272, a handler module 280, a queue(s) module 284, and/or a data structure module 282. Any module in supervisor 170 may be made up of any combination of software, hardware and/or firmware suitable for the function(s) attributed to the module herein.

When included, recognizer 272 may, for instance, be configured to recognize one or more characteristic(s) of a data packet. The subject matter does not limit how recognizer 272 may recognize characteristic(s) of a data packet. For the purpose of illustration only, however, some examples are now presented. For example, one or more characteristic(s) may be recognized using deep packet inspection. Additionally or alternatively, for example, one or more characteristic(s) may be recognized from the header(s) of the data packet. Additionally or alternatively, for example, one or more characteristic(s) may be recognized at least partly based on previous signaling in wireless network 100.

Noter 274 may, for instance, be configured to note a time associated with a data packet en route from PDN 190 to base station 130. Additionally or alternatively, rioter 274 may for instance, be configured to note a time associated with a data packet en route from base station 130 to PDN 190. For instance, in some cases, rioter 274 may note a first time associated with a particular (non-acknowledgement) data packet en route from PDN 190 to base station 130, and if a reliable protocol such as Transmission Control Protocol (TCP) is being used, note a second time associated with an acknowledgement data packet en route from base station 130 to PDN 190 which acknowledges the particular data packet, in a manner which imparts that there is a relationship between the first time with the second time. Additionally or alternatively, noter 274 may for instance, be configured to note one or more characteristic(s) recognized by recognizer 272 (when included), if any.

Noter 274 may, for instance, be configured to note times and/or characteristics in a data structure. The data structure may be located in supervisor 170, e.g. data structure 282 when included, or may be located externally to supervisor 170 but in a location accessible to e.g. noter 274 and/or evaluator 276. Additionally or alternatively, voter 274 may, for instance, note times and/or characteristics to evaluator 276 for use by evaluator 276 without necessarily storing times and/or characteristics in a data structure.

Evaluator 276 may, for instance, be configured to evaluate the service provided by base station 130, for instance at least partly based on one or more noted times. Evaluator 276 may, for instance, be configured at least partly on a result of the evaluating to determine whether or not one or more action(s) should be performed. The subject matter does not limit the way in which evaluator 276 may evaluate the service and/or determine whether or not one or more action(s) should be performed. The subject matter does not limit the action(s) regarding which evaluation may be made.

When included, handler 280 may, for instance, be configured to handle data packets. For instance, when handler 280 is included, a data packet en route from PDN 190 to base station 130 and/or a data packet en route from base station 130 to PDN 190, may be intercepted by handler 280 and subsequently forwarded by handler 280 in order that the data packet may continue to base station 130 or PDN 190.

When included, queue(s) 284 may, for instance, include one or more (data packet) queue(s) where data packet(s) may be queued. The subject matter does not limit the number and/or type of queue(s) 284.

In some instances when included, data structure 282 and/or queue(s) 284 may be comprised in memory, where memory or medium may refer to any module for storing data for the short and/or long term, locally and/or remotely.

Action performer 278 may, for instance, be configured to perform one or more actions, at least partly based on a determination by evaluator 276. The subject matter does not limit the type(s) of action(s) which may be performed by action performer 278.

Alternatively to the example shown in FIG. 2, system 170 may in some examples include fewer, more and/or different modules than shown in FIG. 2. Alternatively to the example shown in FIG. 2 the functionality of system 170 may in some examples be divided differently among the modules illustrated in FIG. 2. Therefore any function attributed to a certain module in an example herein may additionally or alternatively be performed by different module(s). Alternatively to the example shown in FIG. 2, the functionality of system 170 described herein may in some examples be divided into fewer, more and/or different modules than shown in FIG. 2. Alternatively to the example shown in FIG. 2, system 170 may in some examples include additional, less, and/or different functionality than described herein. For example, system 170 may include functionality unrelated to supervision in wireless network 100.

Figure 3:
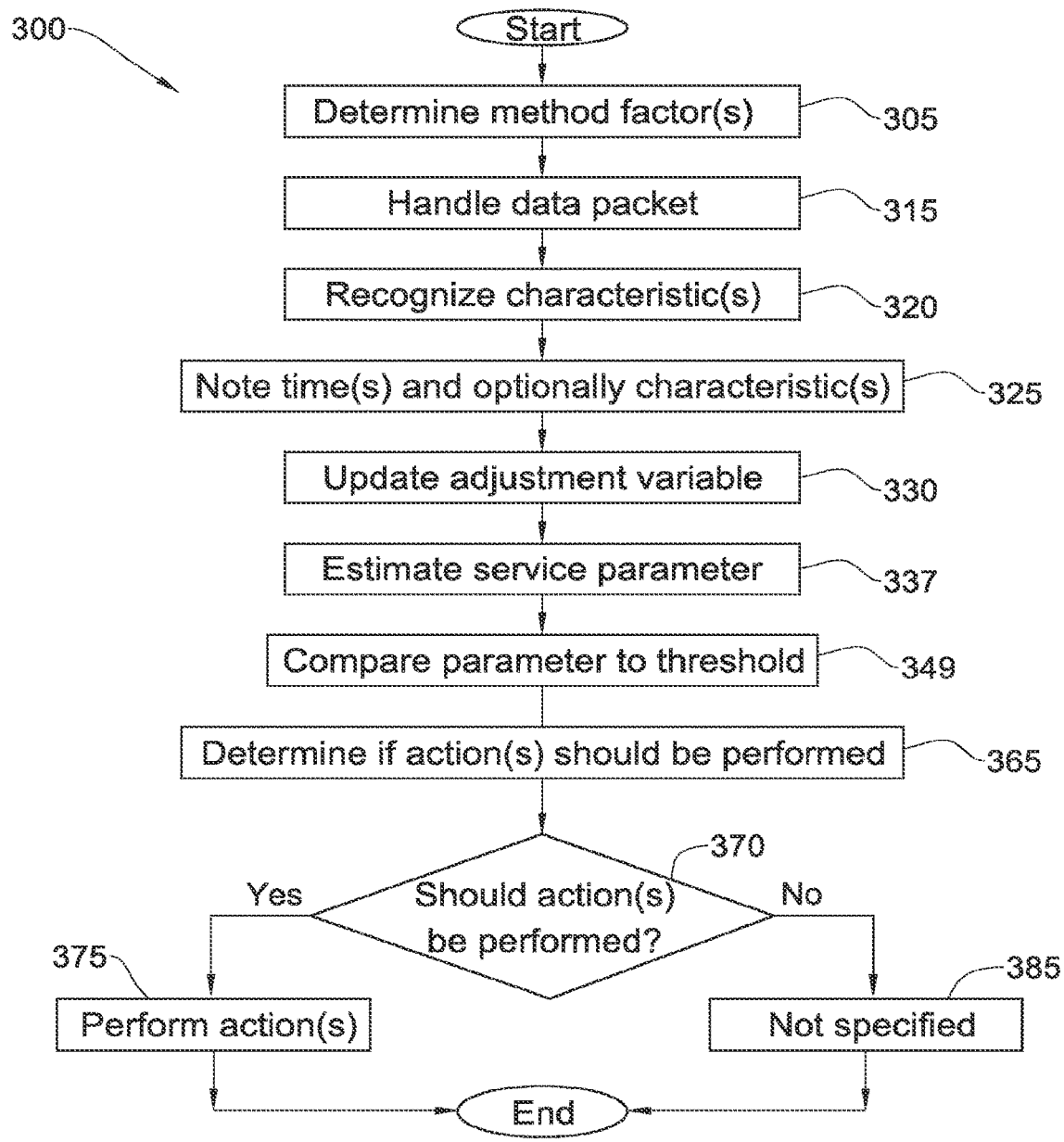
FIG. 3 is a flowchart of an example of a supervision method, in accordance with the presently disclosed subject matter.

FIG. 3 is a flowchart of an example of a supervision method 300 in accordance with the presently disclosed subject matter. Method 300 may be performed for example by supervisor 170. Supervision method 300 may be used for instance, for supervising data in wireless system 100 in a manner which may vary between very passive to very active.

As the timing and/or circumstance(s) for performing various stage(s) in method 300 may vary depending on the example of supervision, for simplicity of description the timing and/or circumstance(s) are ignored in the description of method 300.

In the illustrated example, in optional stage 305, one or more factors relating to method 300 may be determined by supervisor 170, for instance by evaluator 276. Factor(s) may be determined, for instance, by way of received input, e.g. from an operator (via an input device such as a keypad, keyboard, mouse and/or any other input device) and/or e.g. from an external element (external to supervisor 170) such as a planning tool, database and/or any other element. Additionally or alternatively, factor(s) may be determined, for instance, based on experience and/or applicable condition(s) (e.g. any of current time of day, location of base station 130, etc). The subject matter does not limit the factor(s) which may optionally be determined in stage 305. In some other examples, stage 305 may be omitted if no factors are to be determined.

Depending on the example, a data packet en route from PDN 190 to base station 130 or en route from base station 130 to PDN 190 may or may not be handled by supervisor 170, e.g. by handler 280. If handled, then in optional stage 315, handler 280 may handle the data packet, e.g. intercept the data packet which may subsequently be forwarded.

In the illustrated example, in optional stage 320, characteristic(s) of the data packet may be recognized by supervisor 170, for instance, by recognizer 272. For instance, characteristic(s) may be recognized using deep packet inspection, from packet header(s), and/or at least partly based on earlier signaling, etc. In some other examples, stage 320 may be omitted, for instance if characteristic(s) are not relevant for later stages of method 300.

In the illustrated example, in stage 325, supervisor 170, for instance noter 274, may note one or more time(s) associated with the data packet and/or may note recognized characteristic(s). For instance, for a packet en route from PDN 190 to base station 130 a time associated with travel in that direction and possibly if there is a corresponding acknowledgement packet, a time associated with travel of the corresponding acknowledgement packet in the opposite direction may be noted.

Depending on the instance, stages 315 to 325, when performed, may be performed fir different data packets in parallel, or the stages may be completed for one data packet before being performed for another data packet.

In the illustrated example in optional stage 330, an adjustment variable may be updated by supervisor 170, e.g. by evaluator 276. For instance, an adjustment variable may attempt to adjust for cause(s), not directly related to base station 130, which may affect the value of a service parameter. The subject matter does not limit how the adjustment variable may be updated. Although updating may occur at any time, for simplicity of illustration, stage 330 is illustrated after stage 325. In some other examples, stage 330 may be omitted, for instance if cause(s) not directly related to base station 130 may be ignored, or if an adjustment variable may not easily and/or reliably be determined. In some of these other examples where stage 330 may be omitted, the adjustment variable may be a constant configurable value.

In the illustrated example, in optional stage 337, a service parameter may be estimated by supervisor 170 (e.g. by evaluator 276) for an individual user equipment 110 (e.g. any one of a plurality of user equipments 110; any one of a plurality of user equipments 110 associated with any of one or more groups served by one or more wireless transmitters; any one of a plurality of user equipments 110 which compete for service in base station 130 as scheduled by a scheduler; etc). Additionally or alternatively, a service parameter may be estimated by supervisor 170 (e.g. by evaluator 276) for a plurality of user equipments 110 (e.g. a plurality of user equipments 110; a plurality of user equipments 110 associated with any of one or more groups served by one or more wireless transmitters; a plurality of user equipments 110 which compete for service in base station 130 as scheduled by a scheduler; etc). The subject matter does not limit the estimated service parameter, but for the sake of further illustration to the reader, some instances are now provided.

For instance, a possible service parameter 110 for an individual user equipment 110 may reflect and/or be indicative of one or more round trip time(s), one or more adjusted round trip time(s) (e.g. difference(s) of round trip time and round trip adjustment), one or more base station queuing time(s), one or more base station outgoing rate(s), and/or one or more quotient(s) for a round trip time or adjusted round trip time divided by the difference between an outgoing rate and an incoming rate to base station 130, etc. Optionally, a function (e.g. average, sum, etc) may be used in estimating a possible service parameter 110. A round trip time may for instance be estimated as the difference between a time noted for a data packet en route toward the individual UE 110 and the time noted for the corresponding acknowledgement packet. A round trip time adjustment may for instance be an adjustment variable for a round trip time which may attempt to adjust for cause(s) not directly related to any queuing time in base station 130 which may affect the round trip time. The adjustment variable may or may not be constant and/or configurable. A base station outgoing rate to an individual UE 110 may for instance be estimated as a difference between two times noted for two different acknowledgement packets (not necessarily sequential) divided by the difference between the noted sequence numbers.

Additionally or alternatively, for instance, a possible service parameter for a plurality of user equipments 110 may reflect and/or be indicative of service parameters for individual user equipments 110 included in the plurality, e.g. by way of a function such as average, sum, etc. Continuing with this instance, a possible service parameter may include an average of round trip times or functions thereof (e.g. round trip time minus round trip time adjustment) for various user equipments 110 included in the plurality, an average of base station queuing times for various user equipments 110 included in the plurality, a sum of base station outgoing rate from base station 130 for various user equipments 110 included in the plurality 110, and/or an average of quotients for various user equipments 110, etc. Additionally or alternatively, for instance, a possible service parameter for a plurality of user equipments 110 may not necessarily reflect and/or be indicative of service parameters for individual user equipments 110 included in the plurality but may be estimated otherwise such as a base station outgoing rate from base station 130 to the plurality of UEs 110 and/or a parameter indicative of service provision by base station 130 to only one (or to more than one) of the plurality of UEs 110, etc.

In the illustrated example, in optional stage 349, an estimated service parameter may be compared to a threshold by supervisor 170 e.g. by evaluator 276.

In instance(s) where stage 330, 337 and/or 349 may be performed, the stages) may be performed one time or a plurality of time(s). If performed a plurality of times, the adjustment variables, estimated parameters, and/or thresholds from different iterations may relate to the same user equipment(s) 110 (and/or the same plurality of user equipments 110) and/or to different user equipment(s) 110 (and/or to different pluralities of user equipments 110).

One or more iteration(s) of stage 337 and/or 349 may for instance be performed as part of an evaluation of the service provided by base station 130. An evaluation of service may, for instance, additionally or alternatively be at least partly based on one or more noted times. The subject matter does not limit how service is evaluated, and the evaluation may additionally or alternatively include stage(s) unrelated to estimating parameter(s) and/or comparing threshold(s).

In the illustrated example, in stage 365, at least partly based on a result of the service evaluation, supervisor 170, for instance evaluator 276, may determine whether or not to perform one or more action(s).

In the illustrated example, if it is determined to perform at least one action (yes to stage 370), then in the illustrated example, in stage 375 at least one action may be performed, for instance by action performer 278. The subject matter does not limit which action(s) may be performed. For instance, examples of an action may include an action which may not necessarily affect data packet(s) traveling in wireless network 100, and/or an action which may affect data packet(s) traveling in wireless network 100. For the sake of further illustration an example of possible action(s) will now be described. In this example, at least one action may be performed in order to reduce the fullness of at least one queue in base station 130. In some cases of this example, the evaluation of service provided by base station 130 may include an evaluation of the fullness of at least one queue in base station 130. In some of these cases, the evaluation of the fullness may include estimation of a service parameter which may be negatively impacted by base station queuing time(s) and therefore may be indicative of the status (e.g. fullness) of base station queue(s). The subject matter does not limit which action(s) may be performed to reduce the fullness of queue(s), and any suitable action may be performed such as delaying packet(s), etc. See also the description with reference to FIGS. 4 to 7 regarding possible examples of actions that may be performed, which may or may not be the same as action(s) performed to reduce the fullness of queue(s).

if it is not determined to perform an action (no stage 370), then depending on the example one or more action(s) may or may not be performed in stage 385.

In some instances, stages 365 to 385 may not necessarily be performed for each data packet, but may be performed for instance, after each predefined number of data packets.

In the illustrated example after stage 375 or 385, method 300 may end. Method 300 or a part thereof may or may not be repeated, for instance by iterating to any appropriate stage in method 300. If repeated the timing and/or circumstance(s) for repetition may vary depending on the example of supervision. Possibly, even if method 300 is not repeated, or between repetitions, one or more stage(s) of method 300 may be performed, for other purpose(s) and/or to maintain routine for supervisor 170.

In some instances, stages 315 to 325 may have continued to be performed as data packets may have been handled while stages 330 to 375 were being performed, but in other examples stages 315 to 325 may not have continued to be performed while stages 330 to 375 were being performed.

Alternatively to the example illustrated in FIG. 3, stages which are shown in as being executed sequentially may in some other examples be executed in parallel, and/or stages shown as being executed in parallel may in some other examples be executed sequentially. Alternatively to any of the example illustrated in FIG. 3, method 300 may in some other examples include more, fewer and/or different stages than illustrated. For instance, method 300 may, for instance, additionally or alternatively include any of the stage(s) described with reference to FIG. 5 or FIG. 7. Alternatively to the example illustrated in FIG. 3, stages may in some other examples be executed in a different order than illustrated.

Figure 4:
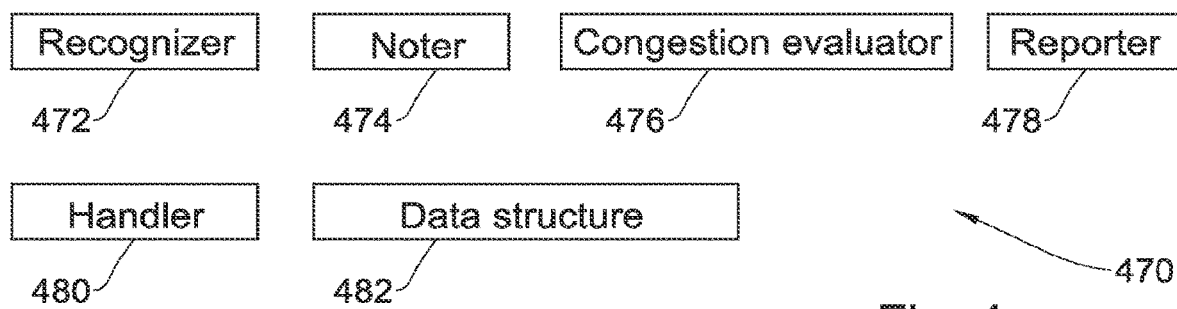
FIG. 4 is a block diagram of an example of an observer system, in accordance with the presently disclosed subject matter.

FIG. 4 is a block diagram of an example of an observer system 470, in accordance with the presently disclosed subject matter. Observer system 470 may be configured to observe congestion in wireless system 100 and/or any observable situation in wireless network 100. Observer system 470 may be an example of supervisor system 170, and therefore the description of system 470 may not necessarily repeat details described with reference to system 170.

In the illustrated example, observer system 470 may include a recognizer module 472, a noter module 474, a congestion evaluator module 476, a reporter module 478, and optionally a handier module 480 and/or data structure module 482. Modules 472, 474, 476, 478, 480 and/or 482 may be examples of modules 272, 274, 276, 278, 280 and/or 282 respectively. Any module in observer 470 may be made up of any combination of software, hardware and/or firmware suitable for the function(s) attributed to the module herein. For example, observer system 470 or any part thereof may include a computer.

Handler module 480 may be optional since depending on the instance, recognizer 472 and/or noter 474 may be configured to perform function(s) relating to a data packet en route from PDN 190 and base station 130 without handler 480 handling the data packet, or may be configured to perform function(s) relating to a data packet en route from PDN 190 and base station 130 in the case that handler 480 handles the data packet. Additionally or alternatively, depending on the instance, recognizer 472 and/or noter 474 may be configured to perform function(s) relating to a data packet en route from base station 130 to PDN 190 without handler 480 handling the data packet, or may be configured to perform function(s) relating a data packet en route from base station 130 to PDN 190 in the case that handler 480 handles the data packet. For instance, a data packet on the way from PDN 190 to base station 130 or vice versa, may or may not be intercepted by handler 480 and may or may not be subsequently forwarded by handler 480 in order that the data packet may continue to base station 130 or PDN 190.

For instance recognizer 472 may be configured to recognize one or more characteristic(s) of a data packet. The subject matter does not limit how recognizer 472 may recognize characteristic(s) of a data packet. For the purpose of illustration only, however, some examples are now presented.

For example, one or more characteristic(s) may be recognized by using deep packet inspection.

Additionally or alternatively, for example, one or more characteristic(s) may be recognized from the header(s) of the data packet. For instance, depending on the example any of sequence number, type of data packet, tunnel identifier, destination address, source address, destination port, source port etc may be recognized from header(s) of the data packet. Additionally or alternatively, for instance, the layer 7 header may indicate the type of user traffic such as browsing, streaming video, streaming audio, downloading, etc. Additionally or alternatively, for instance, for a data packet which is an acknowledgement data packet such as in a reliable protocol, e.g. TCP a possible characteristic may be the acknowledgement number which enables correspondence to corresponding data packet(s) for which the acknowledgement data packet is acknowledging receipt.

Additionally or alternatively, for example, one or more characteristic(s) may be recognized at least partly based on previous signaling in wireless network 100. For instance, a group (served by a wireless transmitter) and/or base station identifier and/or UE identifier may have been determined from previous signaling. The signaling may have included, for instance, a Service Area Identifier (or the equivalent) which may be used to identify a service area comprising one or more groups served by one or more wireless transmitters in the same location area and may therefore be considered to be an example of a group (served by a wireless transmitter) and/or base station identifier. The signaling may have additionally or alternatively included, for instance, a permanent Non-Access Stratum UE identity (or equivalent) which may be considered to be an example of a UE identifier. A group (served by a wireless transmitter) and/or base station identifier and/or a UE identifier may have been stored in an accessible location to recognizer 472, perhaps in association with an associated identifier (e.g. tunnel identifier, destination address, source address, destination port and/or source port etc) which may be included in a data packet header, so that recognizer 472 may be configured to recognize that the data packet relates to a certain group served by a wireless transmitter, base station, and/or UE 110 at least partly based on the stored identifier(s). For instance, recognizer 472 may thereby be capable of recognizing the particular UE 110 for which the data packet is destined or from which the data packet originated. Additionally or alternatively, for instance, recognizer 472 may thereby be capable of recognizing the particular group served by a wireless transmitter and/or base station 130 associated with the particular UE 110 for which the data packet is destined or from which the data packet originated.

Noter 474 may, for instance, be configured to note a time associated with a data packet en route from PDN 190 to base station 130, e.g. any of the time that the packet passes the location of noter 474 (e.g. without handling), the time the data packet is intercepted by handler 480, the time the data packet is forwarded by handler 480, etc. Additionally or alternatively, rioter 474 may for instance, be configured to note a time associated with a data packet en route from base station 130 to PDN 190, e.g. any of the time that the packet passes the location of rioter 474 (e.g. without handling), the time the data packet is intercepted by handler 480, the time the data packet is forwarded by handler 480, etc. The data packet traveling in either direction may or may not be an acknowledgement data packet. For instance if a reliable protocol such as TCP is being used, an acknowledgement data packet may be sent to acknowledge receipt for any bytes prior to a certain sequence number. In some cases, noter 474 may note a first time associated with a particular (non-acknowledgement) data packet traveling from PDN 190 to base station 130 and note a second time associated with an acknowledgement data packet traveling from base station 130 to PDN 190 which acknowledges the particular data packet, in a manner which imparts that there is a relationship between the first time and the second time (and/or imparts that there is a relationship between both times and the particular (non-acknowledgement) data packet).

Additionally or alternatively, noter 474 may, for instance, be configured to note one or more characteristic(s) recognized by recognizer 472. For instance, noter 474 may in some cases reference one or more noted time(s) to any of a sequence number, UE identifier, group (served by a wireless transmitter) and/or base station identifier, data packet type, etc.

Noter 474 may, for instance, be configured to note times and/or characteristics in a data structure. The data structure may be located in observer 470, e.g. data structure 482 when included, or may be located externally to observer 470 but in a location accessible to e.g. noter 474 and/or congestion evaluator 476. Additionally or alternatively, noter 474 may note the times and/or characteristics to congestion evaluator 476 for use by evaluator 476 without necessarily storing times and/or characteristics in a data structure.

Congestion evaluator 476 may, for instance, be configured to evaluate whether or not a set comprising one or more groups served by one or more wireless transmitters is congested. Depending on the example, a set may include all of the group(s) serviced by base station 130 or may include fewer group(s) than all the group(s) serviced by base station 130. The subject matter does not limit the way in which congestion evaluator 476 may evaluate congestion. Some examples of stages which congestion evaluator 476 may perform to evaluate whether or not a set is congested are described below with reference to FIG. 5.

Additionally or alternatively, congestion evaluator 476 may, for instance, be configured to evaluate one or more parameter(s) relating to base station service, and/or evaluate with respect to observable situation(s) in wireless network 100 without necessarily evaluating whether or not a set is congested.

Reporter 478 may, for instance, be configured to output a report of congestion, if congestion evaluator 476 determined that a set is congested. Optionally, reporter 478 may, for instance, be configured to output a report of non-congestion, if congestion evaluator 476 determined that a set is not congested. Additionally or alternatively, reporter 478 may, for instance, be configured to output a report regarding base station service, not necessarily relating to congestion. The subject matter does not limit the content and format of any report outputted by reporter 478 and/or the destination of the output. For instance, if determined that there is congestion a report may include an indication of congestion, and/or may indicate a level of congestion. For instance, the report may be outputted to an operator (e.g. via a display, printer and/or any other output device), and/or to an element external to observer 470 (e.g. a planning tool, database, and/or any other element).

Alternatively to the example shown in FIG. 4, system 470 may in some examples include fewer, more and/or different modules than shown in FIG. 4. Alternatively to the example shown in FIG. 4 the functionality of system 470 may in some examples be divided differently among the modules illustrated in FIG. 4. Therefore any function attributed to a certain module in an example herein may additionally or alternatively be performed by different module(s). Alternatively to the example shown in FIG. 4, the functionality of system 470 described herein may in some examples be divided into fewer, more and/or different modules than shown in FIG. 4. Alternatively to the example shown in FIG. 4, system 470 may in some examples include additional, less, and/or different functionality than described herein. For example, system 470 may include functionality unrelated to observation in wireless network 100.

Figure 5:
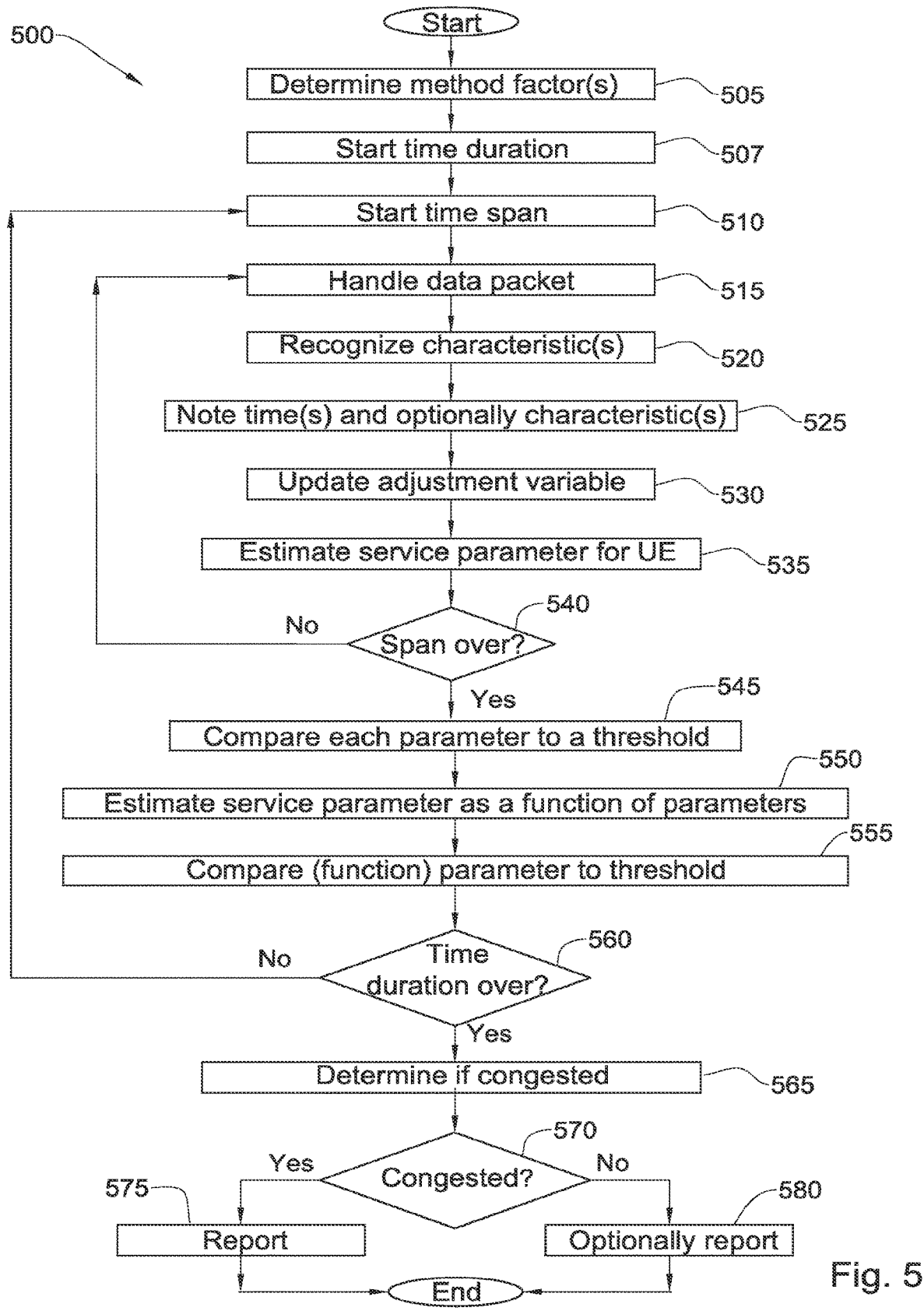
FIG. 5 is a flowchart of an example of an observation method, in accordance with the presently disclosed subject matter.

FIG. 5 is a flowchart of an example of an observation method 500 in accordance with the presently disclosed subject matter. Method 500 may be performed for example by observer 470. Observation method 500 may be used for instance, for observing congestion in wireless system 100 and/or observing any situation in wireless network 100. Observation method 500 may be an example of supervision method 300, and therefore the description of method 500 may not necessarily repeat details described with reference to method 300.

In the illustrated example, in optional stage 505, one or more factors relating to method 500 may be determined, by observer 470, for instance by congestion evaluator 476. Factor(s) may be determined by way of received input, e.g. from an operator (via an input device such as a keypad, keyboard, mouse and/or any other input device) and/or from an external element (external to observer 470) such as a planning tool, database and/or any other element. Additionally or alternatively, factor(s) may be determined based on experience and/or applicable condition(s) (e.g. any of current time of day, location of set for which congestion is being evaluated, etc). Stage 505 may be an example of stage 305.

The subject matter does not limit the factor(s) which may be determined in stage 505, but for the sake of further illustration to the reader, some instances will now be presented. For instance, factor(s) may include any of the following: how frequently congestion is evaluated, threshold(s), a time span during which a particular user equipment 110 would need to be associated with a set (at any time during the time span) in order for the particular user equipment 110 to be considered during the congestion evaluation, service parameter(s) associated with any user equipment 110, initial adjustment variable(s) (if not constant but configurable), how to update an adjustment variable (if not constant), constant adjustment variable (if constant and configurable), minimum value for adjustment variable (if not constant but configurable), a time duration (e.g. which may or may not be equivalent to the time span) for which congestion is evaluated, function(s) of user equipment service parameters, the number of time(s) during a time duration that a comparison is made to a threshold, how to determine whether or not a set is congested based at least partly on the comparison result, a percentage of user equipments for evaluating congestion, when to report, and/or what to report, etc. In some other examples, stage 505 may be omitted if no factors are to be determined.

Optionally, method 500 or a part thereof(e.g. from stage 510 until the end) may be repeated at any frequency. For instance the frequency may depend on a determination made in stage 505.

in the illustrated example, in stage 507, a time duration may begin. A time duration may be a duration for which congestion is evaluated as will be explained in more detail with reference to stage 560.

In the illustrated example, in stage 510, a time span may begin. When possible, a service parameter may be estimated for each of a plurality of user equipments 110 associated with a set (at any time) during that time span as will be described below. As will be described below, it may not necessarily be possible to estimate a performance parameter for every user equipment 110 which may be associated with the set during that time span due to lack of information.

In the illustrated example, in optional stage 515, a data packet traveling in either direction (from PDN 190 to base station 130 servicing the set or from base station 130 to PDN 190) may optionally be handled by observer 470, e.g. by handler 480 intercepting and subsequently forwarding the packet (e.g. after stage 520). However, in some other examples, stage 515 may be omitted and the data packet may not be handled. Stage 515 may be an example of stage 315.

In the illustrated example, in stage 520, characteristic(s) of the data packet may be recognized by observer 470, for instance by recognizer 472. For instance, characteristic(s) may be recognized using any of deep packet inspection, from packet header(s), and/or at least partly based on earlier signaling, etc. Stage 520 may be an example of stage 320.

In the illustrated example, in stage 525, observer 470, for instance noter 474, may note one or more time(s) associated with a data packet and/or recognized characteristic(s). For instance, for a packet en route from PDN 190 to base station 130 the time that the time that the packet passes the location of voter 474 (e.g. without handling), the time the data packet is intercepted, or the time the data packet is forwarded may be noted. Possibly, if there is a corresponding acknowledgement data packet, a time for the corresponding acknowledgement packet such as the time the acknowledgement packet passes the location of rioter 474 (e.g. without handling), the time the acknowledgement packet is intercepted, or the time the acknowledgement packet is forwarded may be noted, e.g. with reference to the corresponding data packet which travelled in the direction from PDN 190 to base station 130. Stage 525 may be an example of stage 325.

In the illustrated example in optional stage 530, an adjustment variable may be updated by observer 470, e.g. by congestion evaluator 476. For instance, assume that a service parameter for user equipment 110 for which the data packet is destined is at least partly dependent on the time noted for the data packet and the time noted for the corresponding acknowledgement data packet. (If the acknowledgement data packet acknowledged more than one data packet which traveled toward destined user equipment 110, it is assumed herein for simplicity of description that the noted time is the time associated with the last acknowledged data packet. However in other examples the time may be a function of times associated with the acknowledged data packets, mutatis mutandis). The difference between the time noted for the data packet, traveling in the direction toward user equipment 110 and the time noted for the corresponding acknowledgement data packet may be caused by one or more causes, and may not necessarily be solely due to base station queuing time (e.g. time between when the data packet arrived at base station 130 and when the data packet left base station 130 on the way to user equipment 110 which may reflect the service provided by base station 130 to user equipment 110). Cause(s) unrelated to the base station queuing time may include cause(s) related to the base station (but not to the base station queuing time) and/or cause(s) unrelated to the base station. Depending on the instance, any cause(s) unrelated to the base station queuing time may be ignored, or an adjustment variable may be estimated in order to attempt to adjust for these other cause(s). The adjustment variable associated with a specific parameter may be particular to user equipment 110, may be common to all group(s) served by wireless transmitter(s) in the set, or may be common to a subset of groups served by wireless transmitter(s) comprised in the set.

The subject matter does not limit how the adjustment variable may be updated, but for the sake of further illustration to the reader, an instance is now provided.

Consider that the adjustment variable is trying to estimate the minimum period between when a certain data packet traveling toward UE 110 would be observed (with or without handling) by observer 470 and a corresponding acknowledgement would be observed (with or without handling) by observer 470 when there would be practically no queuing time between the time of arrival of the certain data packet at base station 130 and the time of leaving of the certain data packet from base station 130, and therefore the length of the period would be dependent on cause(s) other than the base station queuing time. Such an adjustment variable is also termed herein as "round trip time adjustment". For instance such an adjustment variable may be initially updated (set) to a value such as 10 or 20 ms. The adjustment variable may be reset to such a value, for instance any time wireless network 100 may be reconfigured (e.g. adding, changing, and/or deleting an element in wireless network 100). The adjustment variable may optionally be updated by slowly being increased (e.g. 1 ms per hour). However, if the difference between the time noted for a data packet traveling toward user equipment 110 and the time noted for the corresponding acknowledgement data packet is less than the current adjustment variable, the adjustment variable may be updated to equal a minimum value (e.g. initial value) so as to reflect a minimum period. If the adjustment variable is specific to a particular user equipment 110, then the adjustment variable may be updated to the minimum value only if the difference relates to that user equipment 110, but if the adjustment variable is common to all groups (s) or to a subset of group(s) comprised in a set, then the adjustment variable may be updated to the minimum value provided the difference relates to any user equipment 110 associated with any of the group(s) or with any of the subset of group(s).

Although the updating in stage 530 may occur at any time, as described above, for simplicity of illustration, stage 530 is illustrated between stages 525 and 535. Stage 530 may be an example of stage 330.

In some other examples, stage 530 may be omitted, for instance if cause(s) not directly related to base station 130 may be ignored, or if an adjustment variable may not easily and/or reliably be determined. In some of these other examples where stage 530 may be omitted, the adjustment variable may be a constant configurable value.

In the illustrated example, in stage 535, a service parameter may be estimated for a given user equipment 110 (to which the current data packet is destined) by observer 470, for instance by congestion evaluator 476. The service parameter may provide some sort of indication of service that is being provided by base station 130 to that user equipment 110. Possibly, a service parameter may be negatively affected by the queuing time in base station 130, and in this case the parameter may be considered indicative of base station queuing time. Stage 535 may be an example of stage 337. The subject matter does not limit the estimated service parameter, but for the sake of further illustration to the reader, some instances are now provided.

For instance, a possible service parameter may estimate a round trip time (e.g. the difference between the time noted for the current data packet traveling to the given user equipment 110 and the time noted for the corresponding acknowledgement data packet). Additionally or alternatively, for instance a possible service parameter may estimate a function (e.g. average, sum, etc) of a plurality of round trip times, e.g. with each round trip time e.g. reflecting the time noted for a certain data packet traveling to the given user equipment 110 and the time noted for the corresponding acknowledgement data packet. For instance, additionally or alternatively, a possible service parameter may estimate an adjusted round trip time (e.g. round trip time minus a round trip time adjustment). Additionally or alternatively, for instance a possible service parameter may estimate a function (e.g. average, sum, etc) of a plurality of adjusted round trip times, with each round trip time e.g. reflecting a round trip time and round trip time adjustment. Additionally or alternatively, for instance, a possible service parameter may be indicative of base station queuing time. Additionally or alternatively, for instance, a possible service parameter may be a function (e.g. average, sum, etc.) of parameters indicative of base station queuing times. Additionally or alternatively, for instance, a possible service parameter may estimate a base station outgoing rate (e.g. the difference between two times noted for two different acknowledgement packets, not necessarily sequential, from the given UE 110 divided by the difference between the noted sequence numbers). It is noted that since an outgoing rate may rely on acknowledgement packets which are not necessarily sequential, meaning not necessarily Wowing one another in order, an outgoing rate may possibly be calculated even when intervening packet(s) relate to a protocol which is not necessarily reliable, e.g. User Datagram Protocol (UDP). Additionally or alternatively, for instance, a possible service parameter may estimate a function (e.g. average, sum, etc) of a plurality of outgoing rates, with each outgoing rate e.g. reflecting two times noted for acknowledgement packets and sequence numbers. Additionally or alternatively, for instance, a possible service parameter may estimate a quotient for a round trip time or adjusted round trip time divided by the difference between an outgoing rate and an incoming rate to base station 130. Additionally or alternatively, for instance, a possible service parameter may estimate a function (e.g. average, sum, etc) of a plurality of quotients. If times were already noted for a plurality of packets destined to the given UE 110 during the time span, the estimated parameter in this iteration of stage 535 may reflect the plurality of packets, a subset of the packets or even only one or two (e.g. last) of the packets. If the estimated parameter for the given UE 110 includes a function (e.g. average, sum, etc), the function may be updated as necessary, e.g. in iteration(s) of stage 535 during the time span.

It is noted that even though a service parameter may be estimated for a particular user equipment 110, the service parameter may be affected by the service provided to other user equipments 110, if any, associated with the set (and may possibly be affected by the service provided to other user equipments 110 associated with base station 130, if any, even if not necessarily associated with the same set, when the base station services more than the set). For instance, assuming other user equipment(s) 110 may be associated with the set and that base station 130 includes a scheduler which does not want to always starve all of these other user equipment(s) 110 in the set, then the service parameter for particular user equipment 110 may possibly at least sometimes reflect a poorer service than if only the particular user equipment 110 was being serviced in the set.

Depending on the instance, stages 515 to 535 may be performed for different data packets in parallel, or the stages may be completed for one data packet before being performed for another data packet.

In the illustrated example, in stage 540, it is determined if the time span has elapsed. If no then in the illustrated example method 500 iterates for further data packet(s), if any.

It may be possible that for one or more UE 110 associated with the set (at any time) during the time span, a service parameter may not necessarily be estimated. For instance a service parameter may not be estimated if there is insufficient information. There may be insufficient information, e.g. if a data packet destined for given UE 110 passed or was handled by observer 470 before the beginning of the time span, even if the corresponding acknowledgement data packet is observed by observer 470 during the time span, if the time the acknowledgment data packet from given UE 110 passes or is handled by observer 470 is after the time span even if the corresponding data packet traveling from PDN 190 to base station 130 was observed by observer 470 during the time span, if no acknowledgement is sent (e.g. in UDP), if no data packet en route given UE 110 nor corresponding acknowledgement data packet is observed by observer 470 during the time span, and/or if only one acknowledgement data packet is observed by observer 470 during the time span (and two are needed to estimate the service parameter), etc.

If the time span has elapsed, then in the illustrated example, method 500 may proceed to the next stage.

In the illustrated example, in optional stage 545, for each of a plurality of UEs 110 for which a service parameter was estimated, the estimated service parameter may be compared to a threshold by observer 470, e.g. by congestion evaluator 476. Stage 545 may be an example of stage 349. The subject matter does not limit the threshold. The threshold may be the same for all UEs 110 in the set, may vary for different UEs 110, may be constant over time, and/or may vary over time, etc. In some examples, stage 545 may be omitted, for instance if stage 555 is performed instead.

In the illustrated example, in optional stage 550 observer 470, e.g. congestion evaluator 476, may estimate a service parameter for the plurality of UE's 110 (for which respective service parameters were estimated) which is a function of the respective estimated service parameters. For instance, the function may be an average or a sum of the estimated parameters fur the plurality of UEs 110. Possibly, a service parameter may be negatively affected by the queuing time in base station 130 for data packet(s) destined for any of the plurality of UEs 110, and in this case the parameter may be considered indicative of base station queuing time. Stage 550 may be an example of stage 337.

In the illustrated example, in optional stage 555, a service parameter which was estimated in stage 550 by way of a function of the estimated parameters for the plurality of UEs 110 may be compared to a threshold by observer 470, e.g. by congestion evaluator 476. Stage 555 may be an example of stage 349. The subject matter does not limit the threshold. The threshold may be constant over time, and/or may vary over time, etc. In some examples, stages 550 and/or 555 may be omitted, for instance if stage 540 was performed instead.

In the illustrated example, in stage 560 it may be determined if a time duration for which congestion is being evaluated is over. For instance, a time duration may include an integer number of time spans so that stage 545 and/or 555 may be repeated more than once in order to determine if the set is congested. Therefore in the illustrated example if the result of the determination is that the time duration is not over, method 500 may iterate to stage 510 for another time span. In examples where the time duration is different than a time span but may not include an integer number of time spans, a similar consequence of the time duration not being over may occur, mutatis mutandis. If only a comparison relating to one time span is necessarily made (in stage 545 and/or 555) in order to determine if the set is congested then the time duration may be the same as the time span and separate stages 507 and 560 may be omitted.

If the time duration is over (yes to stage 560) then in stage 565, observer 470, e.g. congestion evaluator 476, may determine whether or not the set is congested at least partly based on comparison result(s). Stage 565 may be an example of stage 365.

The subject matter does not limit how it may be determined whether or not the set may be congested, but for the sake of further illustration to the reader, some instances are now presented.

For instance, assume that during the time duration, there may be a predetermined percentage of user equipments 110 associated with a set for which the respective estimated parameter when compared to a respective threshold is indicative of poor service to the respective user equipment 110. Further assuming a parameter of round trip time or adjusted round trip time estimated for any user equipment 110, a particular user equipment 110 may be considered to be poorly serviced, if e.g. the estimated parameter is above a threshold, in this instance, if for a predetermined percentage of user equipments 110 the comparison is indicative of poor service to the respective UE 110, then it may be determined that the set is congested. If stage 545 and/or 555 is performed more than once during the predetermined time duration, then depending on the instance, it may be determined that the set is congested if there is a predetermined percentage (although not necessarily comprising each time the same user equipments 110) each time the comparison is made, at least one time that the comparison is made, and/or most of the time(s) that a comparison is made, etc.

Additionally or alternatively, assume that during the time duration, when comparing to a threshold a service parameter, which is an average of respective service parameters estimated for a plurality of user equipments 110 associated with a set, the result of the comparison is indicative of poor service to the set. Assuming an estimated parameter of round trip time or adjusted round trip time for any user equipment 110, it may be considered that there is poor service to the set if the average of the estimated parameters is above the threshold. In this instance, it may be determined that the set is congested. If stage 545 and/or 555 is performed more than once during the predetermined time duration, then depending on the instance, it may be determined that the set is congested if the average is indicative of poor service when compared to the threshold (although the average may not necessarily be each time a function of service parameters for the same user equipments 110) each time the comparison is made, and/or at least one time that the comparison is made, most of the time(s) that a comparison is made, etc.

Possibly, if a report of congestion may include a level of congestion, stage 565 may also include a determination of a level of congestion. The subject matter does not limit how a level of congestion is determined but for the sake of further illustration to the reader, some instances are now provided.

For instance, assuming that a predetermined percentage of UEs 110 having estimated service parameters above or below threshold(s) it is indicative of congestion, the actual percentage (equal to or higher than the predetermined percentage) may be indicative of the level of congestion. Continuing with this instance, if a percentage of say 80% is indicative of congestion, then a percentage of say 90% may possibly be indicative of higher congestion than a percentage of say 85%. Additionally or alternatively, for instance, the amount that an estimated parameter for a UE 110 may be above or below a threshold may be indicative of the congestion level. Continuing with this instance, when considering a predetermined percentage of UEs 110 with an estimated parameter above an associated threshold as indicative of congestion, the average amount that an estimated parameter is above a threshold, the maximum amount that an estimated parameter is above a threshold, and/or the minimum amount that an estimated parameter is above a threshold, etc may be indicative of the congestion level. Continuing with this instance, if the maximum amount (and/or average, minimum, etc) above the threshold is lower, then it may possibly be indicative of a lower congestion level than if the maximum amount (and/or average, minimum, etc) is higher. Additionally or alternatively, for instance, assuming that an average of estimated parameters being above or below a threshold is indicative of congestion, the amount that the average is above or below the threshold may be indicative of the congestion level. Continuing with this instance, if the amount above the threshold is lower, then it may possibly be indicative of a lower congestion level than if the amount were higher. Additionally or alternatively, for instance, assuming that a comparison is made a plurality of times, and a certain number of time(s) out of the plurality that comparison result(s) is/are indicative of congestion may be considered to be indicative of congestion, then the actual number of time(s) equal to or greater than the certain number of time(s) that comparison result(s) is/are indicative of congestion may be indicative of the level of congestion. Continuing with this instance, if comparisons are performed four times, and it is considered indicative of congestion if at least one time the comparison result is indicative of congestion, then if four times the comparison result is indicative of congestion, it may possibly be indicative of a higher level of congestion than if only once the comparison result is indicative of congestion.

Assuming stage 545 and/or 555 are performed a plurality of times during a time duration, the determination in stage 565 may be based on result(s) of comparing from one or more iteration(s) of stage 545 and/or 555, and therefore may be considered to be at least partly based on a result of comparing from at least one of the iterations.

In the illustrated example, if it is determined that the set is congested (yes to stage 570), then in the illustrated example in stage 575 a report relating to the congestion may be outputted by observer 470, e.g. by reporter 478. If not (no to stage 570), then in the illustrated example in stage 580 a report may or may not be outputted. Stage 570 may be an example of stage 370. Stage 575 may be an example of stage 375. Stage 580 may be an example of stage 385.

As mentioned above, a report may be of any format and may include any content. For instance if congestion is determined the report may include an indication of congestion and/or an indication of the level of congestion. If a report is outputted when it is not determined that the set is congested, the report may include for instance an indication that it was not determined that the set was congested. The report may be outputted to an operator and/or to an external element.

Additionally or alternatively, a report may be outputted which may not necessarily be related to congestion, but may additionally or alternatively be related to one or more observable situation(s) in wireless network 100. For instance, a report may include estimated parameter(s), and/or an indication of a relationship between estimated parameter(s) and respective threshold(s). In some cases of this instance, such a report may regard the status of one or more queue(s) in base station 130, e.g. if the estimated parameter(s) may be negatively impacted by base station queuing time(s) and therefore may be indicative of the status of base station queue(s). (The status of base station queue(s) may be an example of an observable situation in wireless network 100.)

Outputting a report (or equivalently reporting) may be considered an example of an action which may not necessarily affect data packet(s) en route between PDN 190 and base station 130 (e.g. traveling from PDN 190 to base station 130 and/or from base station 130 to PDN 190).

In the illustrated example, method 500 may end. Method 500 or a part thereof may or may not be repeated, for instance by iterating to any appropriate stage in method 500. If repeated, the frequency of repetition may be dependent on the desired frequency for evaluating congestion. Possibly, even if method 500 is not repeated, or between repetitions, one or more stage(s) of method 500 may be performed, for other purpose(s) and/or to maintain routine for observer 470.

Alternatively to the example illustrated in FIG. 5, stages which are shown in as being executed sequentially may in some other examples be executed in parallel, and/or stages shown as being executed in parallel may in some other examples be executed sequentially. Alternatively to any of the example illustrated in FIG. 5, method 500 may in some other examples include more, fewer and/or different stages than illustrated. Alternatively to the example illustrated in FIG. 5, stages may in some other examples be executed in a different order than illustrated.

Figure 6:
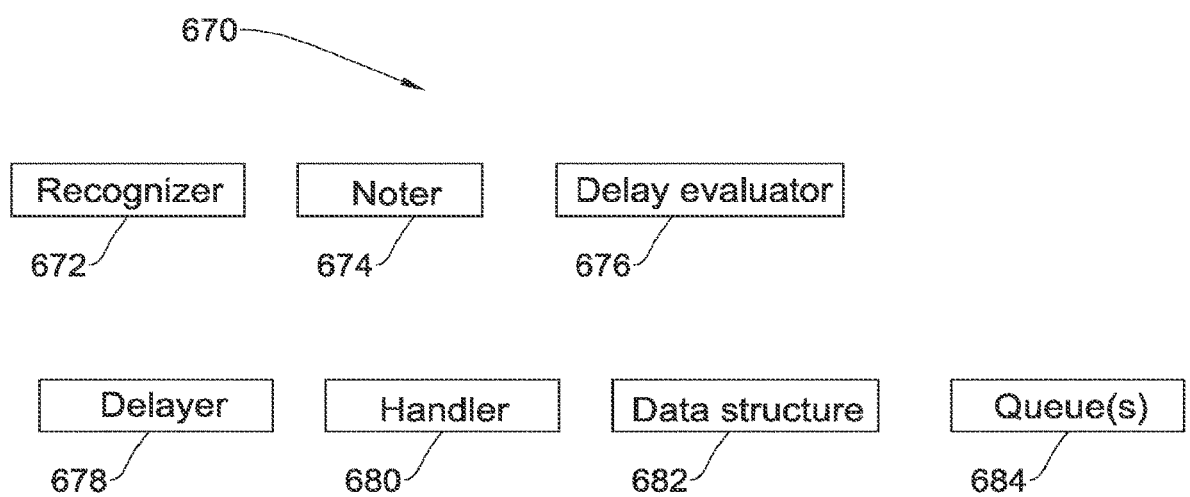
FIG. 6 is a block diagram of an example of an affector system, in accordance with the presently disclosed subject matter.

FIG. 6 is a block diagram of an example of an affector system 670, in accordance with the presently disclosed subject matter. Affector system 670 may be configured to affect data in wireless network 100. Affector system 670 may be an example of supervisor system 170 and therefore the description of system 670 may not necessarily repeat details described with reference to system 170.

In the illustrated example, affector 670 may include a recognizer module 672, a noter module 674, a delay evaluator module 676, a delayer module 678, a handler module 680, a queue(s) module 684, and optionally a data structure module 682. Modules 672, 674, 676, 678, 680, 682 and/or 684 may be examples of modules 272, 274, 276, 278, 280, 282 and/or 284 respectively. Any module in affector 670 may be made up of any combination of software, hardware and/or firmware suitable for the function(s) attributed to the module herein. For example, affector system 670 or any part thereof may include a computer.

Handler module 680, for instance, may be configured to handle data packets. For instance, a data packet en route from PDN 190 to base station 130 may be intercepted by handler 680 and subsequently forwarded by handler 680 in order that the data packet may continue to base station 130 or PDN 190. Alternatively, a data packet en route from PDN 190 to base station 130 may not be handled by handler 680. For instance the data packet may not necessarily be handled if the packet is not to be delayed. Depending on the instance, a data packet en route from base station 130 and PDN 190 may or may not be handled.

For instance recognizer 672 may be configured to recognize one or more characteristic(s) of a data packet. The subject matter does not limit how recognizer 672 may recognize characteristic(s)) of a data packet. For the purpose of illustration only, however, some examples are now presented.

For example, one or more characteristic(s) may be recognized using deep packet inspection.

Additionally or alternatively, for example, one or more characteristic(s) may be recognized from the header(s) of the data packet. For instance, depending on the example any of sequence number, type of data packet, tunnel identifier, destination address, source address, destination port, source port etc may be recognized from header(s) of the data packet. Additionally or alternatively, for instance, the layer 7 header may indicate the type of user traffic such as browsing, streaming video, streaming audio, downloading, etc. Additionally or alternatively, for instance, for a data packet which is an acknowledgement data packet such as in a reliable protocol, e.g. TCP a possible characteristic may be the acknowledgement number which enables correspondence to corresponding data packet(s) for which the acknowledgement data packet is acknowledging receipt.

Additionally or alternatively, for example, one or more characteristic(s) may be recognized at least partly based on previous signaling in wireless network 100. For instance, possibly a group (served by a wireless transmitter) and/or base station identifier and/or UE identifier may have been determined from previous signaling. The signaling may have included, for instance, a Service Area Identifier (or the equivalent) which may be used to identifier a service area comprising one or more groups served by one or more wireless transmitters in the same location area and may therefore be considered to be an example of a group (served by a wireless transmitter) and/or base station identifier. The signaling may have additionally or alternatively included, for instance, a permanent Non-Access Stratum UE identity (or equivalent) which may be considered to be an example of a UE identifier. A group (served by a wireless transmitter) and/or base station identifier and/or a UE identifier may have been stored in an accessible location to recognizer 672, perhaps in association with an associated identifier (e.g. tunnel identifier, destination address, source address, destination port, and/or source port etc) which may be included in a data packet header, so that recognizer 672 may recognize that the data packet relates to a certain group served by a wireless transmitter, base station, and/or UE at least partly based on the stored identifier(s). For instance, recognizer 672 may thereby recognize UE 110 for which the data packet is destined or from which the data packet originated. Additionally or alternatively, for instance, recognizer 672 may thereby recognize the group served by a wireless transmitter and/or base station 130 associated with UE 110 for which the data packet is destined or from which the data packet originated.

Noter 674 may, for instance, be configured to note a time associated with a data packet en route from PDN 190 to base station 130, for instance any of the time the data packet passes rioter 675 (e.g. without handling), the time the data packet is intercepted by handler 680, the time the data packet is forwarded by handler 680, etc. Additionally or alternatively, noter 674 may for instance, be configured to note a time associated with a data packet en route from base station 130 to PDN 190, for instance any of the time the data packet passes noter 674 (e.g. without handling), the time the data packet is intercepted by handler 680, the time the data packet is forwarded by handler 680, etc. The data packet traveling in either direction may or may not be an acknowledgement data packet. For instance if a TCP protocol is being used, an acknowledgement data packet may be sent to acknowledge receipt for any bytes prior to a certain sequence number. For instance, in some cases, noter 674 may note a first time associated with a particular (non-acknowledgement) data packet traveling from PDN 190 to base station 130 and note a second time associated with an acknowledgement data packet traveling from base station 130 to PDN 190 which acknowledges the particular data packet in a manner which imparts that there is a relationship between both times (and/or imparts that there is a relationship between both times and the particular (non-acknowledgement) data packet).

Additionally or alternatively, noter 674 may for instance, be configured to note one or more characteristic(s) recognized by recognizer 672. For instance, noter 674 may in some cases reference one or more noted time(s) to any of a sequence number, UE identifier, group (served by a wireless transmitter) and/or base station identifier, data packet type, etc.

Noter 674 may, for instance, be configured to note times and/or characteristics in a data structure. The data structure may be located in affector 670, e.g. data structure 682 when included, or may be located externally to affector 670 but in a location accessible to noter 674 and/or delay evaluator 676. Additionally or alternatively, noter 674 may note the times and/or characteristics to evaluator 676 for use by evaluator 676 without necessarily storing times and/or characteristics in a data structure.

Delay evaluator 676 may, for instance, be configured to evaluate whether or not to adjust delaying, e.g. whether or not to delay data packet(s) and/or whether or not to stop delaying data packet(s). Herein, the term delay may refer to a delay which is for a finite period of time, or for an infinite period of time. For instance, a packet may be delayed for an infinite period of time by dropping the packet, and the dropping may occur after first delaying the packet for a finite period of time, or may occur without first delaying the packet for a finite period of time.

The subject matter does not limit the manner in which delay evaluator 676 may determine whether or not to adjust delaying. However for further illustration to the reader some examples are now provided. For example, certain UE(s) 110 may be prioritized and therefore data packet(s) destined for those UE(s) 100 may be less likely to be delayed and/or more likely to have delay thereof stopped. Additionally or alternatively for example, certain data packet type(s) may be prioritized and therefore data packets of those type(s) may be less likely to be delayed and/or more likely to have delay thereof stopped. Additionally or alternatively, for example it may be determined to delay data packet(s) in order to shorten the queuing time (where the shortened queuing time may be zero or longer) in base station 130, e.g. so that data packet(s) arriving at base station 130 do not have to wait as long. Continuing with this example, the time for a certain data packet to travel from PDN 190 to UE 110 may be reduced, for instance, if one or more other data packets are delayed so as to shorten the base station queuing time. Additionally or alternatively, for example it may be determined to not delay and/or stop delaying data packet(s) in order to increase the queuing time in base station 130 (from zero or any other queuing time value), e.g. so that there may be a minimum number of data packets in base station 130 at a time. Additionally or alternatively, for example it may be determined to adjust delaying in order to attempt to obtain certain circumstance(s). Some examples of stages which delay evaluator 676 may perform to evaluate whether or not to delay data packets are described below with reference to FIG. 7.

Queue(s) 684 may include one or more (data packet) queue(s) where data packet(s) may be queued. The subject matter does not limit the number or type of queue(s) 684. However for further illustration some examples are now provided. For example, the number and/or type of queues 684 may be set based on the desired basis for prioritization. Additionally or alternatively, for example, there may be separate queue(s) 684 for each UE 110, or any queue 684 may include data packet(s) destined for one or more UEs 110. Additionally or alternatively, there may be separate queue(s) 684 for each data packet type or for each collection of data packet types, or any queue 684 may include data packet(s) of any type. Continuing with this example, there may for instance be two collections of data packet types, with one collection including data packet type(s) for which a high quality of experience for the user may depend on data packets of such type(s) being delivered to the corresponding UE 110 at a constant rate (e.g. streaming media such as video and/or audio, etc.), and another collection including data packet type(s) for which a high quality of experience for a user may be less likely to depend on data packets of such type(s) being delivered to the corresponding UE 110 at a constant rate (e.g. browsing and/or downloading, etc.).

Delayer 678 may, for instance, be configured to adjust delaying. For example, delayer 678 being configured to adjust delaying may include being configured to delay data packet(s), e.g. in queue(s) 682 and/or by dropping, for instance depending on a result of the evaluation by delay evaluator 676. Additionally or alternatively, for example delayer 678 being configured to adjust delaying may include being configured to stop delaying packet(s), e.g. by removing those data packet(s) from queue(s) 682, for instance depending on a result of the evaluation by delay evaluator 676.

Alternatively to the example shown in FIG. 6, system 670 may in some examples include fewer, more and/or different modules than shown in FIG. 6. Alternatively to the example shown in FIG. 6 the functionality of system 670 may in some examples be divided differently among the modules illustrated in FIG. 6. Therefore any function attributed to a certain module in an example herein may additionally or alternatively be performed by different module(s). Alternatively to the example shown in FIG. 6, the functionality of system 670 described herein may in some examples be divided into fewer, more and/or different modules than shown in FIG. 6. Alternatively to the example shown in FIG. 6, system 670 may in some examples include additional, less, and/or different functionality than described herein. For example, system 670 may include functionality unrelated to affecting data in wireless network 100.

Figure 7:
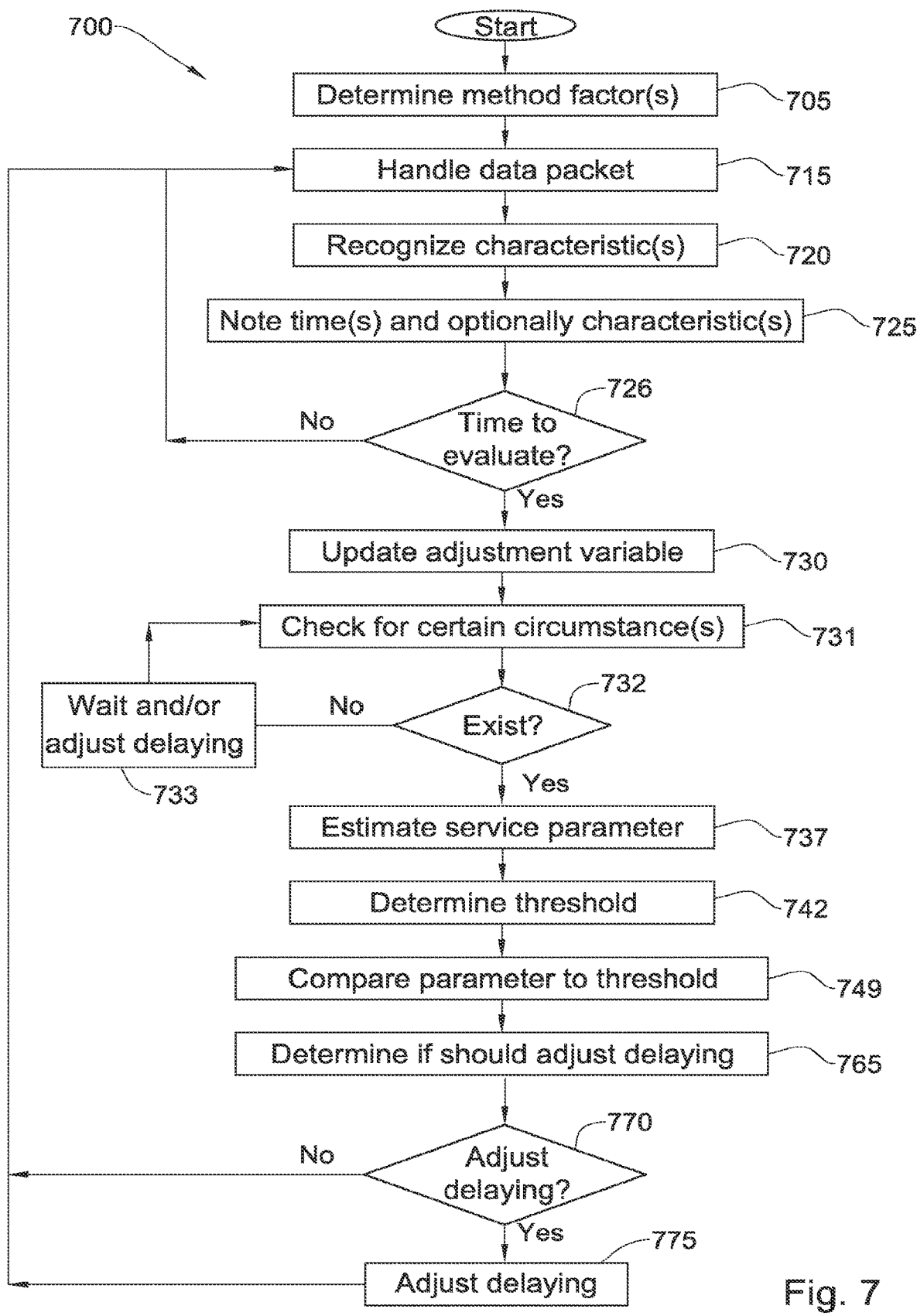
FIG. 7 is a flowchart of an example of an affecting method, in accordance with the presently disclosed subject matter.

FIG. 7 is a flowchart of an example of an affecting method 700 in accordance with the presently disclosed subject matter. Affecting method 700 may be performed for example by affector 670. Affecting method 700 may be used for instance, for affecting data in wireless system 100. Affecting method 700 may be an example of supervision method 300 and therefore the description of method 700 may not necessarily repeat details described with reference to method 300.

In the illustrated example, in optional stage 705, one or more factors relating to method 700 may be determined, by affector 670, for instance by delay evaluator 676. Factor(s) may be determined by way of received input, e.g. from an operator (via an input device such as a keypad, keyboard, mouse and/or any other input device) and/or from an external element (external to affector 670) such as a planning tool, database and/or any other element. Additionally or alternatively, factor(s) may be determined based on experience and/or applicable condition(s) (e.g. any of current time of day, location of base station 130, etc). Stage 705 may be an example of stage 305.

The subject matter does not limit the factor(s) which may optionally be determined in stage 705, but for the sake of further illustration to the reader, some instances will now be presented. For instance, factor(s) may include any of the following: the length of time interval between times of evaluating whether or not to adjust delaying, service parameter(s), one or more threshold(s), how to determine threshold(s) which may at least partly depend on current condition(s), circumstance(s) under which to evaluate whether or not to adjust delaying, number of queue(s), type(s) of queue(s), whether or not delay adjustment should uniformly affect data packet(s), prioritization scheme(s), initial adjustment variable(s) (if not constant but configurable), how to update an adjustment variable (if not constant), constant adjustment variable (if constant and configurable), minimum value for adjustment variable (if not constant but configurable), a time duration, and/or minimum rate per type of data packet for high quality of experience, etc.

In the illustrated example, in optional stage 715, a data packet traveling from PDN 190 to base station 130) may be handled by affector 670, e.g. by handler 680 by intercepting and subsequently forwarding the packet (e.g. after stage 720). A data packet travelling from base station 130 to PDN 190 may be handled by affector 670, e.g. by handler 680 by intercepting and subsequently forwarding the packet (e.g. after stage 720). Stage 715 may be an example of stage 315. Alternatively, stage 715 may be omitted if the data packet is not handled.

In the illustrated example, in stage 720, characteristic(s) of the data packet may be recognized by affector 670, for instance by recognizer 672. For instance, characteristic(s) may be recognized using deep packet inspection, from packet header(s), and/or at least partly based on earlier signaling, etc. Stage 720 may be an example of stage 320.

In the illustrated example, in stage 725, affector 670, for instance noter 674, may note one or more time(s) associated with a data packet and/or recognized characteristic(s). For instance, for a packet en route from PDN 190 to base station 130 the time that the data packet passes the location of noter 674 (e.g. without handling), the time the data packet is intercepted, or the time the data packet is forwarded may be noted. Possibly, if there is a corresponding acknowledgement data packet a time for the corresponding acknowledgement packet such as the time the acknowledgement packet passes the location of noter 274 (e.g. without handling), the time the data packet is intercepted, or the time the data packet is forwarded may be noted, e.g. with reference to the corresponding data packet which travelled in the direction from PDN 190 to base station 130. Stage 725 may be an example of stage 325.

Depending on the instance, stages 715 to 725 may be performed for different data packets in parallel, or the stages may be completed for one data packet before being performed for another data packet.

In the illustrated example, in stage 726 it may be determined by affector 670, for instance by delay evaluator 676 whether or not it is time to evaluate delay adjustment. For instance, the length of the time interval from the last evaluation may have been determined in stage 705. If it is not time to evaluate (no to stage 726) then method 700 iterates to stage 715 and continues to handle data packets without evaluation.

If it is time to evaluate (yes to stage 726) then in the illustrated example in optional stage 730, an adjustment variable may be updated by affector 670, e.g. by delay evaluator 676. For instance, assume that a service parameter for user equipment 110 for which the data packet is destined is at least partly dependent on the time noted for the data packet traveling to user equipment 110 and the time noted for the corresponding acknowledgement data packet. (If the acknowledgement data packet acknowledged more than one data packet, it is assumed for simplicity of description that the noted time is the time associated with the last acknowledged data packet. However in other examples the time may be a function of the times associated with the acknowledged data packets, mutatis mutandis). The difference between the time noted for the data packet travelling in the direction toward user equipment 110 and the time noted for the corresponding acknowledgement data packet may be caused by one or more causes, and may not necessarily be solely due base station queuing time (e.g. time between when the data packet arrived at base station 130 and when the data packet left base station 130 on the way to user equipment 130 which may reflect the service provided by base station 130 to user equipment 110.) Cause(s) unrelated to the base station queuing time may include cause(s) related to the base station (but not to the base station queuing time) and/or cause(s) unrelated to the base station. Depending on the instance, any cause(s) unrelated to the base station queuing time may be ignored, or an adjustment variable may be estimated in order to attempt to adjust for these other cause(s). The adjustment variable associated with a specific parameter may be particular to user equipment 110 or may be common to one or more group(s) served by one or more wireless transmitter(s).

The subject matter does not limit how the adjustment variable may be updated, but for the sake of further illustration to the reader, an instance is now provided.

Consider that the adjustment variable is trying to estimate the minimum period between when a certain data packet traveling toward UE 110 would pass or be handled by affector 670 and a corresponding acknowledgement packet would pass or be handled by affector 670 when there would be practically no queuing time between the time of arrival of the certain data packet at base station 130 and time of leaving of the certain data packet from base station 130, and therefore the length of the period would be dependent on cause(s) other than the base station queuing time. Such an adjustment variable is also termed "round trip time adjustment" herein. For instance such an adjustment variable may be initially updated (set) to a value such as 10 or 20 ms. The adjustment variable may be reset to such a value, for instance any time wireless network 100 is reconfigured (e.g. adding, changing, and/or deleting an element in wireless network 100). The adjustment variable may optionally be updated by slowly being increased (e.g. 1 ms per hour). However, if the difference between the time noted for a data packet traveling to user equipment 110 and the time noted for the corresponding acknowledgement data packet is less than the current adjustment variable, the adjustment variable may be updated to equal difference minimum value (e.g. initial value) so as to reflect a minimum period. If the adjustment variable is specific to a particular user equipment, then the adjustment variable may be updated to the minimum value only if the difference relates to that user equipment 110, but if the adjustment variable is common to one or more group(s) served by one or more wireless transmitter(s), then the adjustment variable may be updated to the minimum value provided the difference relates to any user equipment associated with any of these group(s) served by wireless transmitter(s).

Although the updating in stage 730 may occur at any time, as described above, for simplicity of illustration, stage 730 is illustrated after stage 726. Stage 730 may be an example of stage 330.

In some examples, stage 730 may be omitted, for instance if cause(s) not directly related to base station 130 may be ignored, or if an adjustment variable may not easily and/or reliably be determined. In some of these other examples where stage 730 may be omitted, the adjustment variable may be a constant configurable value.

In the illustrated example, in optional stage 731, it may be checked by affector 670, for instance by delay evaluator 676, whether or not certain circumstance(s) exist. For instance, in some cases it may be preferable to perform an evaluation if certain circumstance(s) exist. The subject matter does not limit the circumstance(s) but for the sake of further illustration to the reader some instances are now presented.

For instance, estimation of a parameter relating to the base station outgoing rate from base station 130 may possibly be facilitated when the round trip time or a function thereof is steady. The round trip time may be estimated as the difference between the time noted for a data packet traveling to user equipment 110 and the time noted for the corresponding acknowledgement data packet. The round trip time or a function thereof may be considered as indicative of the queuing time in base station 130. Therefore, if the round trip time or a function thereof (e.g. round trip time minus round trip time adjustment) is steady, the base station outgoing rate may be estimated as being approximately equal to the incoming rate to base station 130. A base station outgoing rate may be an outgoing rate from base station 130 to any one of a plurality of user equipments 110 or an outgoing rate from base station 130 to the plurality of user equipments. In this case, a steady round trip time or function thereof may be a circumstance that is checked for. The subject matter does not limit for how long the round trip or function thereof should be steady.

Additionally or alternatively, for instance, estimation of a parameter relating to a particular UE 110 whose service may be affected by other UEs 110 competing for service (for instance dependent on a scheduling algorithm of a scheduler in base station 130), may possibly be facilitated when the other UEs 110 are not being serviced, so as to reduce the effect of service to other UEs 110 on the parameter relating to the particular UE 110 and/or to focus on reason(s) relating specifically to the particular UE 110 (such as reception conditions). In this case, non-service to competing UEs 110 may be a circumstance that is checked for. Continuing with this case, there may be a check for a parameter indicative of service provision to only one (or to more than one) of these UEs 110.

In the illustrated example, in optional stage 732, if it may be determined that the checked for circumstance(s) exist(s) (yes to stage 732) then method 700 may proceed to stage 735. If instead it may be determined that the checked for circumstance(s) do not exist (no to stage 732) then method 700 may proceed to stage 733.

In the illustrated example in optional stage 733, affector 670, for instance delay evaluator 676, may wait until the certain circumstance(s) may be met (for a particular evaluation) and/or may instruct delayer 678 to adjust delaying in order to obtain certain circumstance(s) (for a particular evaluation) which delayer 678 may then do.

For instance, assume that initially data packets traveling toward base station 130 are handled by affector 670 but there is no delay in data packets and therefore the rate out of affector 670 (which may be approximated as the incoming rate to base station 130) substantially equals the rate into affector 670, e.g. with First In First Out (FIFO). Further assume that based on noted times, an average round trip time or function thereof for a plurality of UEs 110 (e.g. associated with one or more group(s) served by one or more wireless transmitter(s)) may be determined, and it is perceived that the average is increasing. In order to attempt obtaining a steady average round trip time or function thereof, (disregarding type of packet or destination UE 110 for simplicity of description), delayer 678 may delay data packets for any of these UEs 110 intercepted by handler 680, for instance by dropping packet(s) and/or by placing the intercepted packets in queue(s) 684, e.g. continuing to use FIFO but decreasing the rate out of affector 670 until a steady average round trip time or function thereof is obtained.

Additionally or alternatively, for instance, in order to bring about non-service to all but one of competing user equipment(s) 110, affector 670 may intercept data packet(s) destined for any other competing user equipment(s) 110 and delay the packets) (e.g. by dropping data packet(s) and/or placing the data packet(s) in queue(s) 684). For instance, affector 670 may determine that there is a parameter indicative of data packets being provided by base station to more than one of the competing user equipments 110, and delay packet(s), in order to bring about non-service to all but one of competing user equipments 110.

When performed, the performance of stages 731 to 733, may optionally include estimation of a parameter (e.g. round trip time, adjusted round trip time, and/or a parameter indicative of service provision to only one [or to more than one] of competing user equipments 110, etc), determining at least partly based on the estimated parameter whether or not to adjust delaying, and adjusting delaying if determined to do so.

In the illustrated example after stage 733, method 700 iterates to stage 731.

In some instances, stages 731 to 733 may be omitted, for instance if there is no advantage to performing an evaluation under certain circumstance(s). Additionally or alternatively, if more than one evaluation is performed, of which for part there is an advantage and for another part there is not advantage, then stages 731 to 733 may be performed before the part for which there is an advantage, whereas the other part may be performed without first performing stages 731 to 733.

In the illustrated example, in stage 737, a service parameter may be estimated for an individual user equipment 110 (e.g. any one of a plurality of user equipments 110). A service parameter estimated for an individual user equipment 110 may provide some sort of indication of the service that is being provided to that user equipment 110. Possibly a service parameter may be negatively affected by queuing time in base station 130, and in this case the parameter may be considered indicative of base station queuing time. Additionally or alternatively, a service parameter may be estimated for a plurality of user equipments 110 by affector 670, for instance by delay evaluator 276. Stage 737 may be an example of stage 337. The subject matter does not limit the estimated service parameter, but for the sake of further illustration to the reader, some instances are now provided.

For instance, a possible service parameter for an individual UE 110 may estimate a round trip time (e.g. the difference between the time noted for the current data packet traveling to the individual user equipment 110 and the time noted for the corresponding acknowledgement data packet). Additionally or alternatively, for instance a possible service parameter for an individual UE 110 may estimate a function (e.g. average, sum, etc) of a plurality of round trip times, e.g. with each round trip time e.g. reflecting the time noted for a certain data packet traveling to the individual user equipment 110 and the time noted for the corresponding acknowledgement data packet. For instance, additionally or alternatively, a possible service parameter for an individual UE 110 may estimate an adjusted round trip time (e.g. round trip time minus a round trip time adjustment). Additionally or alternatively, for instance a possible service parameter for an individual UE 110 may estimate a function (e.g. average, sum, etc) of a plurality of adjusted round trip times, with each round trip time e.g. reflecting a round trip time and round trip time adjustment. Additionally or alternatively, for instance, a possible service parameter for an individual UE 110 may be indicative of base station queuing time. Additionally or alternatively, for instance, a possible service parameter for an individual UE 110 may be a function (e.g. average, sum, etc.) of parameters indicative of base station queuing times. Additionally or alternatively, for instance, a possible service parameter for an individual UE 110 may estimate a base station outgoing rate (e.g. the difference between two times noted for two different acknowledgement packets, not necessarily sequential, from the individual UE 110 divided by the difference between the noted sequence numbers). It is noted that since an outgoing rate may rely on acknowledgement packets which are not necessarily sequential, meaning not necessarily following one another in order, an outgoing rate may possibly be calculated even when intervening packet(s) relate to a protocol which is not necessarily reliable, e.g. User Datagram Protocol (UDP). Additionally or alternatively, for instance, a possible service parameter for an individual UE 110 may estimate a function (e.g. average, sum, etc) of a plurality of outgoing rates, with each outgoing rate e.g. reflecting two times noted for acknowledgement packets and sequence numbers. Additionally or alternatively, for instance, a possible service parameter for an individual UE 110 may estimate a quotient for a round trip time or adjusted round trip time divided by the difference between an outgoing rate and an incoming rate to base station 130. Additionally or alternatively, for instance, a possible service parameter for an individual UE 110 may estimate a function (e.g. average, sum, etc) of a plurality of quotients. If times were already noted for a plurality of packets destined to the individual UE 110 (e.g. since the last time of evaluation), then a possible service parameter may reflect the plurality of packets, a subset of the packets or even only one or two (e.g. last) of the packets.

It is noted that even though a service parameter may be estimated for a particular user equipment 110, the service parameter may be affected by the service provided to other user equipments 110. For instance, assuming other user equipment(s) 110 may be associated with any of one or more group(s) served by one or more wireless transmitter(s), which compete for service with particular user equipment 110. Further assuming that base station 130 includes a scheduler which does not want to always starve all of these other user equipment(s) 110, then the service parameter for particular user equipment 110 may possibly at least sometimes reflect a poorer service than if only the particular user equipment 110 was being serviced. As mentioned above, under certain circumstance(s), a service parameter may optionally be preferably estimated when no other competing UEs 110 are being serviced.

Assume that additionally or alternatively a possible service parameter may be estimated for a plurality of user equipments 110. Such a service parameter may provide some sort of indication of the service that is being provided to the plurality of user equipments 110. Possibly a service parameter may be negatively impacted by the queuing time in base station 130 for data packet(s) destined for any of the plurality of UE 110, and in this case the parameter may be considered indicative of base station queuing time.

For instance, a possible service parameter estimated for a plurality of equipments 110 may include a function (e.g. average, sum, etc) of service parameters for individual user equipments 110 included in the plurality. For example, a possible service parameter for a plurality of user equipments may be estimated as an average of round trip times or functions thereof (e.g. round trip time minus round trip time adjustment) for various user equipments 110 included in the plurality. An average may reflect for instance any data packet(s) destined for any user equipment(s) 110 included in the plurality with time(s) noted since the last time of evaluation, may reflect a subset of the packets with time(s) noted since the last time of evaluation, or may only reflect one or two packets (e.g. last) with time(s) noted since the last time of evaluation for any user equipment 110 included in the plurality. Additionally or alternatively, for instance, a possible service parameter estimated for a plurality of user equipments 110 may not necessarily include a function of service parameters for individual user equipments 110 included in the plurality. For example a possible service parameter for a plurality of user equipment may include a parameter indicative that service is currently being provided by base station 130 to only one of the plurality of UEs 110, and/or a base station outgoing rate to the plurality of user equipments 110, etc.

As mentioned above, a base station outgoing rate for a particular UE 110 or for a plurality of UEs 110 may possibly be estimated when there is a steady round trip time or function thereof. For instance, for a base station outgoing rate for a particular UE 110, once a round trip time or function thereof for a particular UE 110 is steady, the outgoing rate for the particular UE 110 may be estimated by affector 670, for instance, as approximately equaling the incoming rate to base station 130 of data packet(s) destined for the particular UE 110. The incoming rate may be approximated, say, as approximately equaling the rate that data packet(s) destined the particular UE 110 pass by and/or are forwarded by affector 670. The rate in which the packet(s) pass by and/or are forwarded may be determined, e.g. from noted times. Similarly, for a base station outgoing rate for a plurality of UEs 110, once the average round trip time or function thereof is steady, the base station outgoing rate may be estimated by affector 670, for instance, as approximately equaling the incoming rate to base station 130 of packets destined for any of the plurality of user equipments 110. The incoming rate may be approximated, say, as approximately equaling the rate that data packet(s) destined for any of the plurality of UEs 110 pass by and/or are forwarded by affector 670. The rate in which the packet(s) pass by and/or are forwarded may be determined, e.g. from noted times.

In the illustrated example, in optional stage 742, a threshold may be determined by affector 670, for instance by delay evaluator 676, for comparison with a service parameter. Possibly, a threshold may be at least partly dependent on current condition(s), and therefore may not have been determined earlier (e.g. in stage 705). Thresholds) determined in stage 742 may be the same for all UEs 110, may vary for different UEs 110, may be constant over time, and/or may vary over time, etc. The subject matter does not limit threshold(s) but for the sake of further illustration to the reader some instances are now presented.

For instance, a threshold may be dependent on a minimum required rate to enable a high quality of user experience for types of data packet(s) provided to a UE 110 or to a plurality of UEs 110. Assume, e.g. that in stage 725, the types of data packets may be noted. Possibly a minimum rate per type of data packet may have been determined e.g. in stage 705, in order to determine a threshold dependent on a minimum required rate for a particular UE 110, affector 670 may e.g. add up a minimum rate per type of data packet recently noted for that UE 110. Additionally or alternatively in order to determine a threshold dependent on a minimum required rate for a plurality of UEs 110, affector 670 may e.g. add up the minimum rate per type of data packet recently noted for any UE 110 in that plurality of UEs 110. The subject matter does not limit the definition of "recently", and may include any duration, typically although not necessarily of shorter length than the interval since the last evaluation time.

Stage 742 may be omitted in some instances, or if there is a plurality of iterations of stage 749 with different threshold, stage 742 may be performed for part of the thresholds but not for another part. Any threshold, not necessarily partly dependent on current condition(s), may have been determined earlier or may be determined in stage 742. Such a threshold may be the same for all UEs 110, may vary for different UEs 110, may be constant over time, and/or may vary over time, etc. The subject matter does not limit such a threshold but for the sake of further illustration to the reader some instances are now presented.

For instance, an example of a threshold which may have been determined earlier or during stage 742 may be a threshold dependent on the length of the time interval between evaluations. Additionally or alternatively, for instance, another example of a threshold which may have been determined earlier or during stage 742 may be a threshold indicative of maximum desired base station queuing time. For instance, the maximum desired base station queuing time may be a queuing time which is considered low enough to allow packets prioritized by affector 670 to not wait too long in base station 130, where the designation of what is "not too long" is not limited by the subject matter.

In the illustrated example, in stage 749, an estimated service parameter may be compared to a threshold by affector 670 e.g. by delay evaluator 676. Stage 749 may be an example of stage 349. In the illustrated example, in stage 765, at least partly based on this estimated parameter affector 670, for instance delay evaluator 676, may determine whether or not to adjust delaying of at least one data packet.

Stage 765 may be an example of stage 365. The determining may or may not be at least partly based on quality of experience considerations. If based at least partly on quality of experience considerations, the subject matter does not limit the considerations nor how such considerations may be taken into account in the determining, but for the sake of further illustration to the reader some examples are presented in the description herein of method 700 with reference to thresholds, prioritization schemes, etc.

The subject matter does not limit how the estimated parameter may be taken into account in the determining. For instance, the determining may possibly take into account a relationship between parameter and threshold. The subject matter does not limit the estimated parameter, threshold, and/or manner of determining, but for the sake of further illustration to the reader, some instances are now presented.

For instance, there may be a plurality of competing user equipment(s) 110 which compete for service by base station 130. A scheduler in base station 130 may determine how to schedule the data packets. For simplicity's sake assume the plurality of competing user equipment(s) 110 may be associated with any of one or more group(s) served by one or more wireless transmitter(s). The associated group(s) may or may not be all of the group(s) serviced by base station 130. Assume further that in stage 725 for any data packet a group/base station identifier and a UE identifier are noted (or if affector 670 only notes packets for the group(s)/base station then the group/base station identifier may not necessarily be noted). Affector 670, e.g. delay evaluator 676 may notice that for a given UE 110 (out of the plurality of competing UEs 110) between the noted time a certain packet destined for the given UE 110 passed by or was forwarded by affector 670 and the time noted for an acknowledgement of a subsequent (but not necessarily sequential) packet destined for UE 110, there were no packets for any other competing UEs 110. For instance, any noted passing by or forwarding time of a packet destined for another competing UE 110 as well as the noted time for the corresponding acknowledgement may have been before the noted forwarding or passing by time of the certain packet. Additionally or alternatively for instance, any noted passing by or forwarding time of a packet destined for another competing UE 110 may have been after the acknowledgement time for the subsequent packet for given UE 110. The base station outgoing rate for the given UE 110 when there is no competition may therefore be estimated as the difference between the noted acknowledgement time of the subsequent packet and the noted acknowledgement time of the certain packet divided by the difference between the respective noted sequence numbers. This rate may be indicative of reception conditions for given UE 110. The rate may be compared to a threshold dependent on a minimum required rate for the given UE 110 (e.g. comprising a sum of the minimum rate per type of data packet recently noted for the given UE 110). If the rate is less than the threshold, then it may be determined that based on a result of this comparison delaying should be adjusted, e.g. by affector 670 delaying one or more packet(s) destined for UE 110. If the rate is already equal to or more than the threshold, then no delay adjustment may be necessary based on a result of this comparison (although may possibly be necessary based on a result of another comparison).

Additionally or alternatively, for instance, affector 670 e.g. delay evaluator 676 may estimate the average round trip time or a function thereof (e.g. round trip time less round trip time adjustment) for a plurality of user equipments 110 and determine that the average is steady. Delay evaluator 676 may then estimate that the outgoing rate from base station 130 to the plurality of UEs 110 may be approximately equal to the incoming rate to base station 130 for the plurality of UEs 110 which in turn may be approximately equal to the rate of forwarding and/or passing by affector 670 for the plurality of UEs 110. For instance, if there is no differentiation between the various user equipments 110 in the plurality of user equipments 110 the passing by/forwarding rate may be determined based on noted passing by/forwarding times for packets destined for any of the plurality of user equipments 110. Assuming the type(s) of data packets destined for any of these plurality of equipments have been noted, this rate may be compared to a threshold dependent on a minimum required rate for the plurality of UEs 110 (e.g. comprising a sum of the minimum rate per type of data packet recently noted for any of the plurality of UEs 110). If the rate is less than the threshold, then it may be determined that based on a result of this comparison delaying should be adjusted, e.g. by delaying one or more packet(s) destined for any of the plurality of UEs 110 in affector 670. If the rate is already equal to or more than the threshold, then no delay adjustment may be necessary based on a result of this comparison (although may possibly be necessary based on a result of another comparison). The plurality of user equipments 110 may or may not compete for service and/or may or may not be associated with one or more group(s) served by one or more wireless transmitters (s) of base station 130.

Additionally or alternatively, for instance, affector 670 e.g. delay evaluator 676 may estimate a parameter indicative of base station queuing time in base station 130 (e.g. round trip time or adjusted round trip time) for any individual user equipment 110. If it may be assumed that there is a time interval between evaluation times, meaning that the parameter may be estimated after an interval from the last estimation, delay evaluator 676 may compare the parameter to a threshold dependent on the length of the time interval. If the parameter is shorter than the threshold then affector 670 may determine to adjust delaying (e.g. by stopping delaying at least one packet destined for individual UE 110) and/or may determine not to adjust delaying (e.g. not delaying) at least one packet destined for individual UE 110 based on a result of this comparison. The parameter being shorter than the threshold may be indicative of too short base station queuing time, where the definition of "too short" is not limited by the subject matter but may mean that that base station 130 may not be sufficiently occupied with servicing individual UE 110 and/or that power consumption may be too high. For instance, the adjustment may attempt to cause the parameter indicative of base station queuing time (e.g. e.g. round trip time or adjusted round trip time) to be at least equal to the length of the interval so that base station 110 may be sufficiently occupied with individual UE 110 and/or to improve power consumption. If the parameter is already equal to or longer than the threshold, then affector 670 may determine that stopping delaying and/or not delaying may not be necessary based on a result of this comparison (although may possibly be necessary based on a result of another comparison).

Additionally or alternatively, for instance, affector 670 e.g. delay evaluator 676 may estimate a parameter indicative of base station queuing time (e.g. average round trip time or average adjusted round trip time) for a plurality of user equipments 110. If it may be assumed that there is a time interval between evaluation times, meaning that the parameter may be estimated after an interval from the last estimation, delay evaluator 676 may compare the parameter to a threshold dependent on the length of the time interval. If the parameter is shorter than the threshold, then affector 670 may determine to adjust delaying (e.g. by stopping delaying of at least one packet destined for any of the plurality of user equipments 110) and/or may determine not to adjust delaying (e.g. not delaying) at least one packet destined for any of the plurality of user equipments 110 based on a result of this comparison. The parameter being shorter than the threshold may be indicative of too short base station queuing time, where the definition of "too short" is not limited by the subject matter but may mean that that base station 130 may not be sufficiently occupied with servicing the plurality of UEs 110 and/or that power consumption may be too high. For instance, the adjustment may attempt to cause the parameter indicative of base station queuing time (e.g. average round trip time or adjusted round trip time) to be at least equal to the length of the interval so that base station 110 may be sufficiently occupied with the plurality of UEs 110 and/or to improve power consumption. If the parameter is already equal to or longer than the threshold, then affector 670 may determine that stopping delaying and/or not delaying may not be necessary based on a result of this comparison (although may possibly be necessary based on a result of another comparison). The plurality of user equipments 110 may or may not compete for service and/or may or may not be associated with one or more group(s) served by one or more wireless transmitter(s) of base station 130.

Additionally or alternatively, for instance, affector 670 e.g. delay evaluator 676 may estimate a plurality of parameters indicative of base station queuing time (e.g. round trip time or adjusted round trip time), each for one UE 110 in a plurality of user equipments 110. If it may be assumed that there is a time interval between evaluation times, meaning that each of these parameters may be estimated after an interval from the last estimation, delay evaluator 676 may compare each of these parameters to a threshold dependent on the length of the time interval. If for a predetermined percentage of comparisons the parameter is shorter than the threshold, then affector 670 may determine to adjust delaying (e.g. by stopping delaying of at least one packet destined for any of the plurality of user equipments 110) and/or may determine not to adjust delaying (e.g. not delaying) at least one packet destined for any of the plurality of user equipments 110 based on a result of this comparison. The parameter being shorter for a predetermined percentage of comparisons may be indicative of too short base station queuing time, where the definition of "too short" is not limited by the subject matter but may mean that base station 130 may not be sufficiently occupied with servicing the plurality of UEs 110 and/or that power consumption may be too high. For instance, the adjustment may attempt to cause for a predefined percentage of UEs 110 the respective parameter indicative of base station queuing time (e.g. round trip time or adjusted round trip time) to at least equal the length of the interval so that base station 110 may be sufficiently occupied with the plurality of UEs 110 and/or to improve power consumption. If, for the predefined percentage, the respective parameter is already equal or longer than the threshold, then affector 670 may determine that stopping delaying and/or not delaying may not be necessary based on a result of this comparison (although may possibly be necessary based on a result of another comparison). The plurality of user equipments 110 may or may not compete for service and/or may or may not be associated with one or more group(s) served by one or more wireless transmitters (s) of base station 130.

Additionally or alternatively, for instance, affector 670 e.g. delay evaluator 676 may estimate a parameter indicative of base station queuing time (e.g. round trip time or adjusted round trip time) fir any user equipment 110. Delay evaluator 676 may compare this parameter to a threshold dependent on a maximum desired base station queuing time. If the parameter is longer than the threshold, then affector 670 may determine to adjust delaying (e.g. by delaying at least one packet for UE 110) based on a result of this comparison. The parameter being longer than the threshold may be indicative of too long base station queuing time, where the definition of "too long" is not limited by the subject matter. For instance, the adjustment may attempt to cause the parameter indicative of base station queuing time (e.g. round trip time or adjusted round trip time) to not exceed the maximum desired base station queuing time. If the parameter is already shorter than or equal to the threshold, then delay adjustment may not be necessary based on result of this comparison (although may possibly be necessary, based on a result of another comparison).

Additionally or alternatively, for instance, affector 670 e.g. delay evaluator 676 may estimate a parameter indicative of base station queuing time (e.g. average round trip time or adjusted round trip time) for a plurality of user equipments 110. Delay evaluator 676 may compare this parameter thereof to a threshold dependent on a maximum desired base station queuing time. If the parameter is longer than the threshold, then affector 670 may determine to adjust delaying (e.g. by delaying at least one packet for any of the plurality of UEs 110). The parameter being longer than the threshold may be indicative of too long base station queuing time, where the definition of "too long" is not limited by the subject matter. For instance, the adjustment may attempt to cause the parameter indicative of base station queuing time (e.g. average round trip time or adjusted round trip time) to not exceed the maximum desired base station queuing time. If the parameter is already shorter than or equal to the threshold, then delay adjustment may not be necessary based on a result of this comparison (although may possibly be necessary based on a result of another comparison). The plurality of user equipments 110 may or may not compete for service and/or may or may not be associated with one or more group(s) served by one or more wireless transmitter(s) of base station 130.

Additionally or alternatively, for instance, affector 670 e.g. delay evaluator 676 may estimate a plurality of parameters indicative of base station queuing time (e.g. round trip time or adjusted round trip time), each for one UE 110 in a plurality of user equipments 110. Delay evaluator 676 may compare each of these parameters to a threshold dependent on a maximum desired base station queuing time. If for a predetermined percentage of comparisons the parameter is longer than the threshold, then affector 670 may determine to adjust delaying (e.g. by stopping delaying of at least one packet destined for any of the plurality of user equipments 110) and/or not delaying at least one packet destined for any of the plurality of user equipments 110 based on a result of this comparison. The parameter being longer for a predetermined percentage of comparisons may be indicative of too long base station queuing time, where the definition of "too long " is not limited by the subject matter. For instance, the adjustment may attempt to cause for a predefined percentage of UEs 110 the respective parameter indicative of base station queuing time (e.g. round trip time or adjusted round trip time) to not exceed the maximum desired base station queuing time. If for the predefined percentage the respective parameter is already shorter than or equal to the maximum desired base station queuing time, then affector 670 may determine that stopping delaying and/or not delaying may not be necessary based on result of this comparison (although may possibly be necessary, based on a result of another comparison). The plurality of user equipments 110 may or may not compete for service and/or may or may not be associated with one or more group(s) served by one or more wireless transmitter(s) of base station 130.

Depending on the number of parameter(s) which may be estimated, any of stages 730 to 765 may be performed one or more times. If performed a plurality of times, the adjustment variables, estimated parameters, and/or thresholds from different iterations may relate to the same user equipment(s) 110 (and/or the same plurality of user equipments 110) and/or to different user equipment(s) 110 (and/or to different pluralities of user equipments 110). If performed a plurality of times, then a final determination of delay adjustment may be made which may consider one or more of the various determinations in stage 765 for the respective comparisons and therefore the final determination of whether or not to adjust delaying may be at least partly based on at least one parameter estimated during at least one of the plurality of times.

If it is determined to adjust delaying (yes to stage 770), then in the illustrated example, in stage 775 there may be an adjustment of the delaying by affector 170, for instance delayer 678 and method 700 may then iterate to stage 715. Stage 770 may be an example of stage 370. Stage 775 may be an example of stage 375. If not (no to stage 770), then in the illustrated example method 700 may iterate directly to stage 715.

For instance, in stage 775, affector 760, e.g. delayer 678, may adjust delaying by delaying data packet(s) (e.g. by placing data packets in queue(s) 684 and/or dropping packet(s)) and/or by stopping delaying of data packet(s) (e.g. removing data packet(s) from queue(s) 684), etc. Additionally or alternatively, delayer 678 may not adjust delaying by way of not delaying data packet(s) (e.g. not putting data packet(s) in queue(s) 684 nor dropping packet(s))). There may be any number and/or type of queue(s) 684. The number and/or type of queues 684 may or may not be set based on the desired basis for prioritization. For instance, there may be separate queue(s) 684 for each UE 110, or any queue 684 may include data packet(s) destined for one or more UEs 110; and/or there may be separate queue(s) 684 for each data packet type or for each collection of data packet types, or any queue 684 may include data packet(s of any type; etc.

Depending on the example, a determination in stage 770 and optionally a subsequent delay adjustment in stage 775 may or may not be applied uniformly to data packets and therefore may not necessarily affect the data packets uniformly. For example, a uniform determination to apply a delay adjustment may include delaying each data packet, delaying each data packet for a certain amount of time, stopping the delay of each data packet, and/or stopping the delay of each data packet after a certain amount of time has passed, etc. For example, a uniform determination not to apply a delay adjustment may include not delaying any data packet. For example, a non-uniform determination regarding delay adjustment may include a data packet prioritization scheme.

In examples where data packets may not be uniformly affected by a delay adjustment, the subject matter does not limit the prioritization scheme. However, for the sake of further illustration to the reader, some examples are now presented.

For example, in a prioritization scheme non-prioritized data packet(s) may be delayed while prioritized data packet(s) may not be delayed or may have delay thereof stopped before non-prioritized data packets.

Additionally or alternatively, for example, selection of data packet(s) in a prioritization scheme may be at least partly random, meaning that certain data packets may be randomly selected to be prioritized while others may be randomly selected to not be prioritized.

Additionally or alternatively, for example, selection of data packet(s) in a prioritization scheme may be at least partly based on time, for instance with earlier (or later) data packets selected to be prioritized and later (or earlier) data packets selected to be non-prioritized.

Additionally or alternatively, for example selection of data packet(s) in a prioritization scheme may be at least partly based on one or more data packet characteristic(s). The subject matter does not limit the prioritization based on packet characteristic(s). However, for the sake of further illustration to the reader, some instances are now presented.

For instance, consider the characteristic of data packet type. Assume that it is determined that a particular UE 110 may not properly receive all data packets destined for particular UE 110 e.g. due to reception conditions even when disregarding other competing UEs 110. Possibly, the base station outgoing rate for particular UE 110 may have been estimated while no other competing UEs 110 were being serviced, as described above. If the base station outgoing rate to this particular UE 110 is estimated to be below the minimum rate required for a certain type of data packet(s) destined for this UE 110, then it may be determined to delay this type of data. If, however, the outgoing rate is not below any minimum rate required for any type of data packet destined for this UE 110 but is below the sum of minimum rates required for all types of data packets destined for UE 110, then it may be determined, for instance to prioritize the data packets of type(s) for which a high quality of user experience depends on a constant rate (e.g. streaming, etc.) and to delay data packet(s) of type(s) for which a high quality of user experience may not necessarily depend on a constant rate (e.g. downloading and/or browsing, etc.).

Additionally or alternatively, for instance, consider the characteristic(s) of data packet type and/or UE 110 identifier. Assume that it is determined that not all of a plurality of UE's 110 may properly receive all data packets destined for these UEs 110. In this instance, prioritization may be based on UE 110 and/or type of data. For example, assume the first priority is to prioritize data packets of type(s) for which a high quality of user experience depends on a constant rate (e.g. streaming, etc). Possibly, the base station outgoing rate for the plurality of UEs 110 may have been estimated as described above. If the base station outgoing rate from base station 130 to this plurality of UEs 110 is estimated to be below the minimum rate required to provide a certain type of data packets for which a high quality of experience depends on a constant rate to even one UE 110 in this plurality which is supposed to be provided with this type of data, then it may be determined to delay this type, even though this type of data is prioritized. If however the outgoing rate to this plurality is at least equal to the minimum rate required to provide a certain type of data packets for which for which a high quality of user experience depends on a constant rate to one or more UE(s) 110 in this plurality which is/are supposed to be provided with this type of data, but not to all UEs 110 in this plurality which are supposed to be provided with this type of data, then based on prioritization of users, this type of data may be delayed for certain user equipment(s) 110 but not for other user equipment(s) 110(s) in the plurality. If however, the outgoing rate to this plurality is at least equal to the minimum rate required to provide a certain type of data packets for which a high quality of user experience depends on a constant rate, to all UEs 110 in this plurality which are supposed to receive this type of data, then this type of data may be prioritized, and other data packet(s) of type(s) for which a high quality of user experience may not necessarily depend on a constant rate (e.g. downloading, and/or browsing, etc) may be delayed.

Additionally or alternatively, for instance, consider the characteristic of data packet type. Assume that it is determined that the queuing time in base station 130 is too long or too short (e.g. when compared to a threshold) for a particular UE 110. On order to simplify the discussion disregard any effect from other UEs 110 and/or reception conditions). If the first priority is to prioritize data packets of type(s) for which a high quality of user experience depends on a constant rate (e.g. streaming, etc), then if the base station queuing time is too long and it is desired to reduce the queuing time, data packet(s) of other type(s) may be more likely to be delayed and/or may be less likely to have delay stopped. However, if the base station queuing time is too short and it is desired to increase the queuing time then data packet(s) of type(s) for which a good quality of user experience depends on a constant rate may be less likely to be delayed and/or more likely to have delay stopped.

Additionally or alternatively, for instance, consider the characteristic of UE identifier. Assume that it is determined the queuing time in base station 130 for a plurality of UEs 110 is too long or too short (e.g. when compared to a threshold). If there is no difference in types of data packets or collections of data packet types (or for simplicity's sake disregarding any differences), but there is a difference in prioritization for different users, then if the base station queuing time is too long (e.g. compared to a threshold) and it is desired to reduce the queuing time, data packet(s) for user equipments 110 associated with non-prioritized user(s) may be more likely to be delayed and/or less likely to have delay stopped. However, if the base station queuing time is too short and it is desired to increase the queuing time then data packet(s) for user equipments 110 associated with prioritized user(s) may be less likely to be delayed and/or more likely to have delay stopped.

It is noted that stages 715 to 725 may have continued to be performed as data packets are handled while stages 726 to 775 were being performed.

In some examples, rather than iterating to stage 715 after stage 770 or 715, method 700 may iterate to any other stage in method 700 or may end. If ended, or between iterations, it may still be possible that one or more stage(s) of method 700 may be performed, for other purpose(s) and/or to maintain routine for affector 670.

In some instances, the time period for a particular data packet to travel from PDN 190 to UE 110 may be reduced due to the delay of one or more other packet(s) in method 700.

Additionally or alternatively, in some instances, method 700 may result in an improved quality of user experience for at least one user.

Alternatively to the example illustrated in FIG. 7, stages which are shown as being executed sequentially may in some other examples be executed in parallel, and/or stages shown as being executed in parallel may in some other examples be executed sequentially. Alternatively to any of the example illustrated in FIG. 7, method 700 may in some other examples include more, fewer and/or different stages than illustrated. Alternatively to the example illustrated in FIG. 7, stages may in some other examples be executed in a different order than illustrated.

Although to ease the understanding of the reader, systems 470 and 670 have been described separately, in some examples, there may be a combined system which may include some or all of the functionality and/or one, some, or all of the modules from system 470 and some or all of the functionality and/or one, some or all of the modules from system 670. Such a combined system may be an example of supervisor system 170. Such a combined system may include any combination of software, hardware and/or firmware. For example such a combined system or any part thereof may include a computer. The subject matter does not limit the location(s) of system 470, 670 or a combination thereof, nor does the subject matter limit whether or not module(s) of the system are concentrated in one location or dispersed, but optionally at least part of the system may be located in a location between one or more PDN(s) 190 and one or more base station(s) 130, and/or optionally at least part of the system may be in the same location as one or more base station(s) 130 but at least logically separate from base station(s) 130. Additionally or alternatively, although to ease the understanding of the reader, methods 500 and 700 have been described separately, in some examples there may be a combined method which may include one, some or all of the stages from method 500 and one, some or all of the stages from method 700. Such a combined method may be an example of method 300.

Referring again to FIG. 1, for simplicity of illustration and description, there may be other element(s) which may be included in wireless network 100, depending on the architecture of wireless network 100, which are not illustrated in nor described with reference to FIG. 1. For instance, there may be router(s), switch(es), and/or any other element(s) which are not illustrated in FIG. 1. (Some examples of such element(s) may be described and illustrated with reference to FIGS. 8 and 9 below.) Depending on the example, any of the systems within the scope of the current subject matter (e.g. system 170, system 470, system 670, a combination system, etc) or any part thereof may be a standalone element and/or may be integrated with any of these other element(s), if existing in network 100, such as with any router(s), switch(es), and/or any other suitable element(s). If any such system or any part thereof is integrated with other element(s), the integrated system may, for instance, include functionality of that system or part thereof and/or functionality of the other element(s). Additionally or alternatively for instance, module(s) in the integrated system may include any module(s) within the scope of the current subject matter (e.g. shown in FIGS. 2, 4, and/or 6, etc). Additionally or alternatively, for instance, the integrated system may be configured to perform part or all of any method within the scope of the current subject matter (e.g. method 300, 500, and/or 700, etc). Additionally or alternatively for instance, such an integrated system may include any combination of software, hardware and/or firmware. For example such an integrated system or any part thereof may include a computer. Additionally or alternatively, a system not integrated with such element(s), an integrated system, or any part thereof may or may not be integrated with base station 130, but in any event may be logically separate from base station 130. If base station 130 is so integrated, a system which includes base station 130 and also includes a system not integrated with such element(s), an integrated system, or any part thereof may for instance, include any combination of software, hardware and/or firmware. For example such a system (in which base station 130 is integrated) or any part thereof may include a computer. Additionally or alternatively for instance, module(s) in such a system may include any module(s) within the scope of the current subject matter (e.g. shown in FIGS. 2, 4, and/or 6, etc). Additionally or alternatively for instance, such a system may be configured to perform part or all of any method within the scope of the current subject matter (e.g. method 300, 500, and/or 700, etc).

Figure 8:
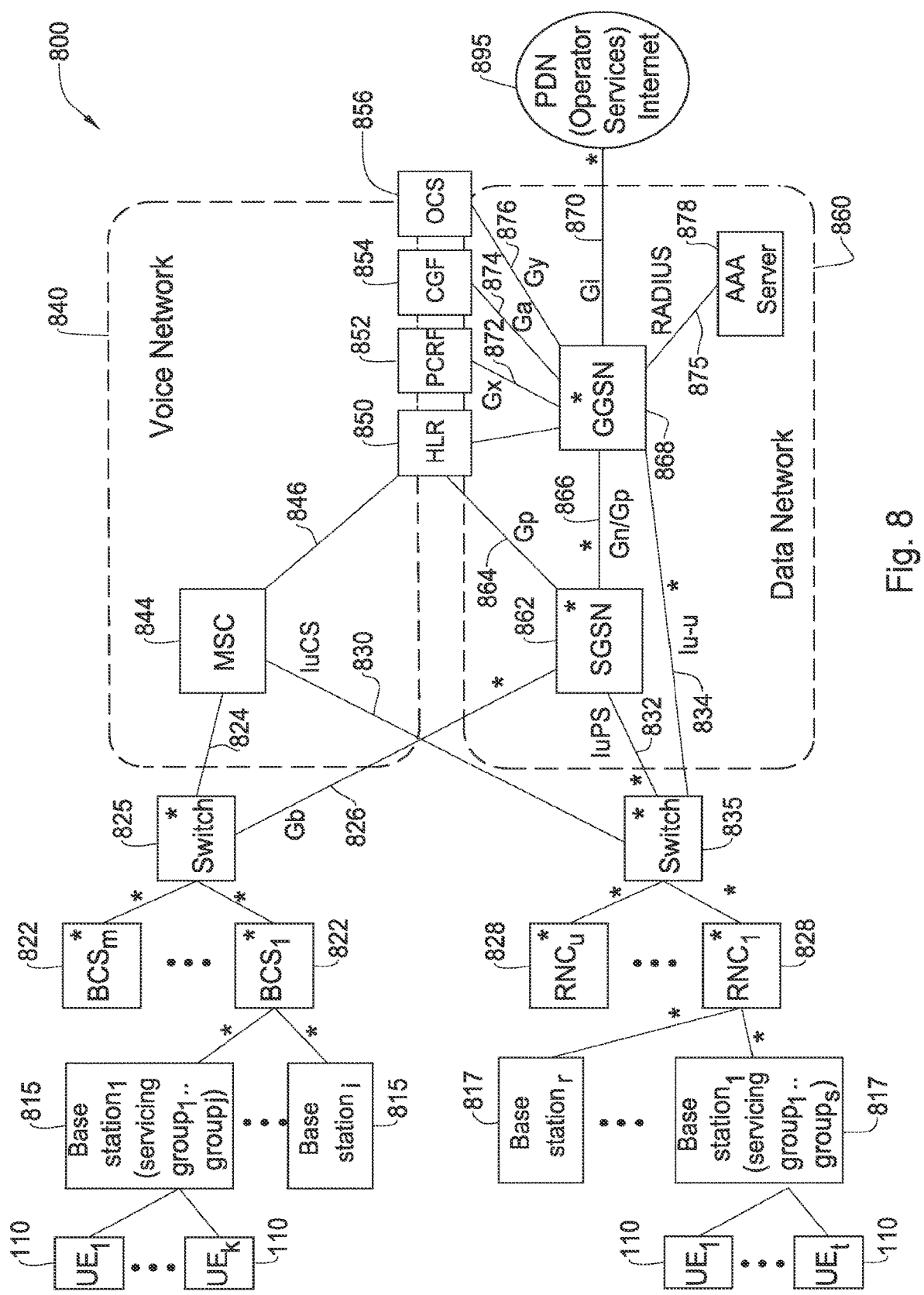
FIG. 8 is a block diagram of an example of a mobile network with a core network of UMTS/GSM architecture, in accordance with the presently disclosed subject matter.
Figure 9:
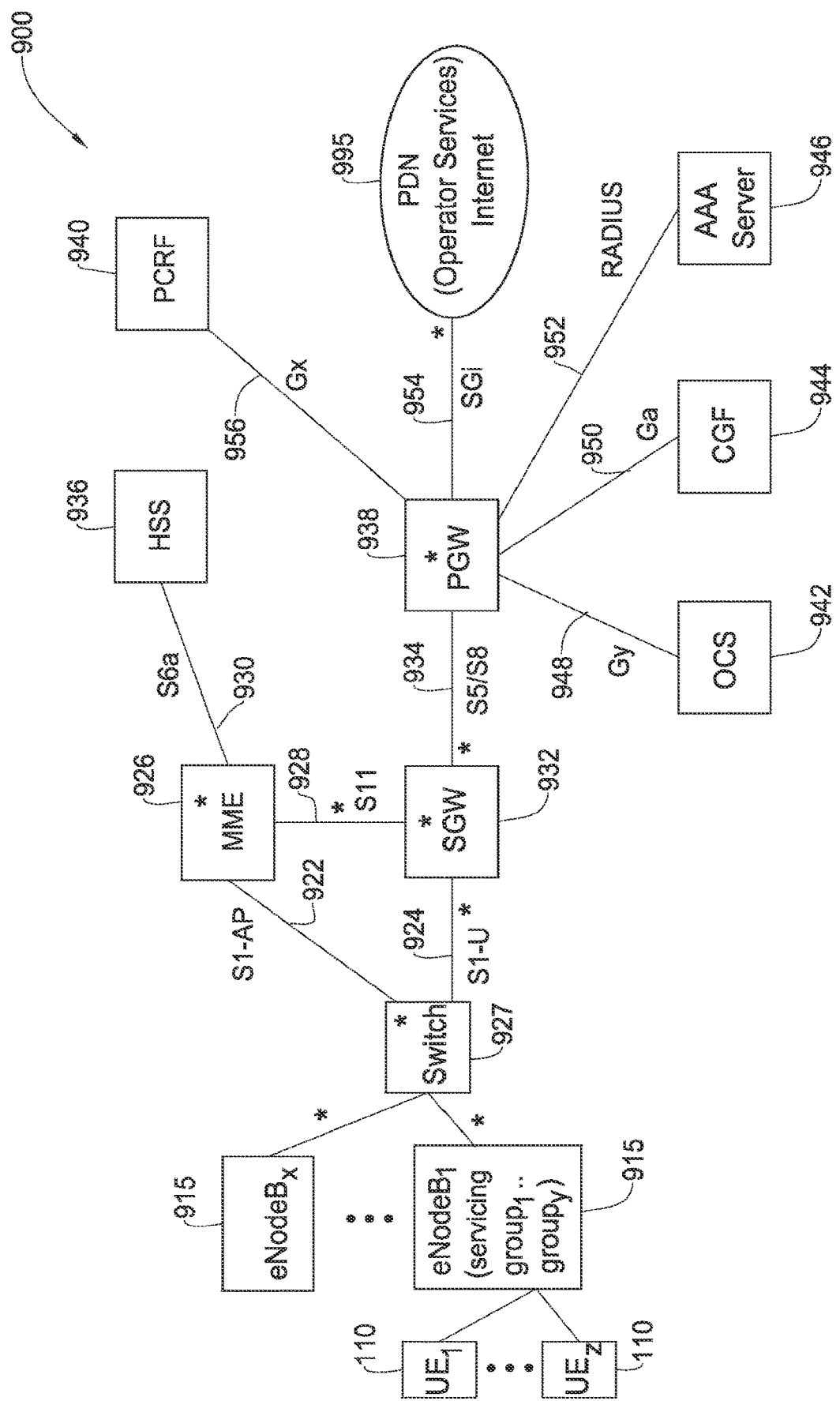
FIG. 9 is a block diagram of an example of a mobile network with a core network of LTE architecture, in accordance with the presently disclosed subject matter.

Although the subject matter does not impose limitations on the architecture of wireless network 100, for the sake of further illustration FIGS. 8 and 9 show some examples of architecture of wireless network 100.

FIG. 8 is a block diagram of an example of a mobile network 800 with a core network of UMTS/GSM architecture, in accordance with the presently disclosed subject matter.

Network 800 may be an example of network 100 discussed above.

In the illustrated example, mobile network 800 may include one or more base station controllers (BSCs) 822 and/or one or more radio network controllers (RNCs) 820. For simplicity of illustration in (in BSC(s) 822 and u (u≥1) RNC(s) 820 are illustrated in FIG. 8 and functionality is described with reference to a first one of each. BSC 822 may be used in GSM Enhanced Data rates for GSM Evolution (EDGE) architecture as well as in combined UNITS/GSM architecture. RNC 528 may be used in UMTS architecture.

In the illustrated example, an interface 824 may interface between BSC 522 and voice network 840 and/or a Gb interface 826 may interface between BSC 822 and data network 860. An IuCS interface 830 may interface between RNC 828 and voice network 840 and/or an IuPS interface 832 and/or an Iu-u interface 834 may interface between RNC 828 and data network 860.

In the illustrated example, data network 860 and optionally voice network 540 may be included in network 800. Although for simplicity of illustration only one element of each type in networks 860 and 840 is illustrated in FIG. 8, it is possible that a different implementation may include multiple elements of any given type.

Optionally mobile network 800 may include any of the following modules: Home Location Registrar (HLR) 850, Policy and charging rules function (PCRF) 852, Charging Gateway Function (CGF) 854, and/or Online Charging System (OCS) 856. Although for simplicity of illustration only one element of each of these types is illustrated in FIG. 8, it is possible that a different implementation may include multiple elements of any given type.

In the illustrated example, voice network 840 (when included), may include a mobile switching center (MSC) 844. An interface 846 may interface between MSC 844 and HLR 850. In the illustrated example, data network 860 may include a Serving GPRS Node (SGSN), a Gateway GPRS Support Node (GGSN), and optionally an Authentication, Authorization, and Accounting (AAA) server 875. A Gn/Gp interface 866 may interface between SGSN 862 and GGSN 866. A Gr interface 864 may interface between SGSN 862 and HLR 850. A Gx interface 872 may interface between PCRF 852 and GGSN 868. A Ga interface 874 may interface between CGF 854 and GGSN 868. A Gy interface 876 may interface between GCS 856 and GGSN 868. A Remote Authentication Dial In User Service (RADIUS) protocol 875 may be used as a protocol between GGSN 868 and AAA server 878.

In the illustrated example, mobile network 800 may also include a PDN 895 (an example of PDN 190). A Gi interface 870 may interface between data network 860 and PDN 895. Although for simplicity of illustration only one PDN 895 is illustrated in FIG. 8, it is possible that a different implementation may include multiple PDNs 895.

In the illustrated example, network 800 may optionally include one or more switches to switch between controllers. For simplicity of illustration, two switches 825 and 835 are shown which switch between BSCs 822 and between RNCs 828 respectively. Each BSC 822 may control one or more base station(s) 815, also referred to as radio base station(s) or base transceiver station(s). For instance, for simplicity of illustration i (i≥1) base station(s) 815 are shown and functionality is described with reference to a first base station 815. Each RNC 828 may control one or more base station(s) 817, also referred to as NodeB(s). For instance, for simplicity of illustration r >1) base station(s) 817 are shown and functionality is described with reference to a first base station 817. Base station(s) 815 and/or base station(s) 817 may be example(s) of base station 130. Each base station 815 may service one or more group(s) served by one or more wireless transmitter(s) and thereby service one or more UE(s) 110. For instance a first base station 815 is shown servicing j group(s) (j≥1) and therefore servicing k UE(s) 110 (k≥1). For instance a first base station 817 is shown servicing s group(s) (s≥1) and therefore servicing t UE(s) 110 (t≥1).

Asterisks ("*") in FIG. 8 illustrate possible locations of supervisor 170 or at least a part thereof. Depending on the example, there may be one or more supervisor module(s) 170 in mobile network 800. For instance, a particular supervisor 170 or at least a part thereof may be located between a particular base station 815 and respective BSC 822 thereof, between a particular base station 817 and respective RNC 828 thereof, in any BSC 822, in any RNC 828, between any RNC 828 and respective switch thereof 835, between any BSC 822 and respective switch thereof 825, in any switch 825 and/or 835, between any switch 835 and SGSN 862, between any switch 825 and SGSN 862, between any switch 835 and GGSN 868, between SSGN 862 and GGSN 868, between GGSN 568 and PDN 595, in SGSN 862, and/or in GGSN 868, etc. Any particular supervisor 170 or any part thereof may be configured to adopt one or more protocols depending on the location of supervisor module 170 or any part thereof in network 800.

FIG. 9 is a block diagram of an example of a mobile network including a core network of LTE architecture, in accordance with the presently disclosed subject matter.

Mobile network 900 may be an example of network 100 discussed above.

In the illustrated example, mobile network 900 may include a Serving Gateway (SGW) 932, a Mobility Management Entity (MME) 926, a PDN Gateway (PGW) 938 and one or more base station(s) 915, also referred to as eNodeB(s). For instance, for simplicity of illustration x (x≥1) base station(s) 915 are shown and functionality is described with reference to a first base station 915. Base station 915 may be an example of base station 130. An S1-U interface 924 may interface between base station 915 and SGW 932. An S1-AP interface 922 may interface between base station 915 and MME 926. An S11 interface 928 may interface between MME 926 and SGW 932. An S5/S8 interface 934 may interface between SGW 932 and PGW 938.

Optionally mobile network 900 may also include any of the following: a Home Subscriber Server (HSS) 936, a PCRF 940, an OCS 942, a CGF 944, and/or an AAA server 946. An S6a interface 930 may interface between MME 926 and HSS 936. A Gy interface 948 may interface between OCS 942 and PGW 938. A Ga interface 950 may interface between CGF 944 and PGW 938. A Gx interface 956 may interface between PCRF 940 and PGW 938. A RADIUS protocol 952 may be used as a protocol between PGW 938 and AAA server 946.

Although for simplicity of illustration only one element of type 926, 927, 932, 936, 938, 950, 942, 944, and 946 in network 900 is illustrated in FIG. 9, it is possible that a different implementation may include multiple elements of any given type.

In the illustrated example, mobile network 900 may also include a PDN 995 (an example of PDN 190). An sGi interface 954 may interface between PGW 938 and PDN 995. Although for simplicity of illustration only one PDN 995 is illustrated in FIG. 9, it is possible that a different implementation may include multiple PDNs 995.

In the illustrated example, network 800 may optionally include one or more switches to switch between base stations 915. For simplicity of illustration, one switch 927 is shown. Network 900 may also includes one or more user equipments(s) 110. Each base station 915 may service one or more group(s) served by one or more wireless transmitter(s) and thereby service one or more UE(s) 110. For instance a first base station 915 is shown servicing y group(s) (y≥1) and therefore, servicing z UE(s) (z≥1).

Asterisks ("*") FIG. 9 illustrate possible locations of supervisor 170 or at least a part thereof. Depending on the example, there may be one or more supervisor module(s) 170 in mobile network 900. For instance, a particular supervisor module 170 or at least a part thereof may be located between base station 915 and switch 927, in switch 927, between switch 927 and MME 926, between switch 927 and SGW 932, between MME 926 and SGW 932, between SGW 932 and PGW 938, between PGW 938 and PDN 995, in MME 926, in SGW 932, and/or in PGW 938, etc. Any particular supervisor 170 or any part thereof may be configured to adopt one or more protocols depending on the location of supervisor 170 or any part thereof in network 900.

It will be understood that the subject matter contemplates, for example, a computer program being readable by a computer for executing a method or part of a method disclosed herein. Further contemplated by the subject matter, for example, is a computer-readable memory tangibly embodying program code readable by a computer for executing a method or part of a method disclosed herein.

EXAMPLES

1. A method of observing congestion in a wireless network, comprising:
for a plurality of user equipments associated during a time span with a set comprising one or more groups served by one or more wireless transmitters, estimating parameters indicative of service to respective user equipments;
comparing the estimated parameters or a function of the estimated parameters to one or more thresholds;
determining whether or not said set is congested at least partly based on a result of said comparing; and
if determined that said set is congested, outputting a report of said congestion.

2. The method of example 1, wherein said estimating and comparing are performed a plurality of times during a time duration and wherein said determining is based on at least one result from at least one of said plurality of times that said comparing is performed.

3. The method of example 1, wherein an estimated one of said parameters for a user equipment in said plurality, is a round trip time.

4. The method of example 1, wherein an estimated one of said parameters for a user equipment in said plurality, is an adjusted round trip time which is a difference between a round trip time and a round trip time adjustment.

5. The method of example 1, wherein said function is an average of at least two estimated parameters respectively associated with at least two user equipments in said plurality.

6. The method of example 1, wherein said determining includes: determining that said set is congested if a result of said comparing is indicative of there being a predetermined percentage of the plurality of user equipments whose round trip times or adjusted round trip times are above one or more thresholds.

7. The method of example 1, wherein said determining includes: determining that said set is congested if a result of said comparing is indicative of an average of round trip times or adjusted round trip times being above a threshold.

8. The method of example 1, wherein said determining includes: if determined that said set is congested, determining a level of congestion.

9. The method of example 1, wherein said report includes an indication of congestion.

10. The method of example 1, wherein said report includes an indication of level of congestion.

11. The method of example 1 wherein said report is outputted to an operator.

12. The method of example 1, wherein said report is outputted to an external element.

13. The method of example 1, further comprising: outputting a report regarding status of one or more queues in a base station servicing said set, 14. A system for observing congestion in a wireless network, comprising:
a congestion evaluator configured, for a plurality of user equipments associated during a time span with a set comprising one or more groups served by one or more wireless transmitters, to estimate parameters indicative of service to respective user equipments; said congestion evaluator further configured to compare the estimated parameters or a function of the estimated parameters to one or more thresholds and to determine whether or not said set is congested at least partly based on a result of said comparing; and
a reporter configured, if determined that said set is congested, to output a report of said congestion.

15. The system of example 14, further comprising: a noter configured to note times associated with data packets, wherein estimation of a parameter is at least partly based on one or more of said noted times, 16. The system of example 15, wherein said noter is further configured to note sequence numbers associated with data packets, wherein estimation of a parameter is at least partly based on one or more of said noted sequence numbers.

17. The system of example 14, further comprising: a recognizer configured to recognize at least one selected from a group comprising: user equipments for which respective data packets are destined, one or more groups served by one or more wireless transmitters associated with user equipments for which respective data packets are destined, or a base station associated with user equipments for which respective data packets are destined.

18. The system of example 14, wherein at least part of said system is located in the wireless network between a packet data network and one or more base stations.

19. A computer program product comprising a computer useable medium having computer readable code embodied therein for observing congestion in a wireless network, the computer program product comprising:

computer readable program code for causing a computer to, for a plurality of user equipments associated during a time span with a set comprising one or more groups served by one or more wireless transmitters, estimate parameters indicative of service to respective user equipments;

computer readable program code for causing a computer to compare the estimated parameters or a function of the estimated parameters to one or more thresholds;

computer readable program code for causing a computer determine whether or not said set is congested at least partly based on a result of said comparing; and computer readable program code for causing a computer, if it is determined that said set is congested, to output a report of said congestion.

20. The computer program product of example 19, further comprising:

computer readable code for causing the computer to note times associated with data packets, wherein estimation of a parameter is at least partly based on one or more of said noted times.

21. A method of affecting data in a wireless network, comprising:

estimating a parameter indicative of service by a base station to any one of a plurality of user equipments or to said plurality of user equipments;

at least partly based on said estimated parameter, determining whether or not to adjust delaying of arrival at the base station of at least one data packet; and if determined to adjust delaying, adjusting delaying of arrival of said at least one data packet.

22. The method of example 21, wherein said parameter is indicative of a base station outgoing rate.

23. The method of example 22, wherein said parameter is a base station outgoing rate to said plurality of user equipments, said estimating including:

determining an average of respective round trip times or functions thereof for the plurality of user equipments;

if necessary, causing an incoming rate into the base station for the plurality of user equipments to change until the average is steady; and estimating that said outgoing rate to said plurality of user equipments is approximately equal to the incoming rate into the base station for the plurality of user equipments, when said average is steady;

and wherein said determining whether or not to adjust delaying includes:

comparing said estimated outgoing rate to a minimum required rate for data to the plurality of user equipments; and determining to delay arrival at the base station of at least one data packet destined for any of the plurality of user equipments if a result of said comparing is indicative that said estimated outgoing rate is less than said minimum required rate.

24. The method of example 22, wherein said parameter is a base station outgoing rate to a certain user equipment in said plurality of user equipments, and wherein said plurality of user equipments compete for service by said base station, said estimating including:

estimating said outgoing rate while the base station is not providing data packets to any other of the plurality of user equipments, said outgoing rate being indicative of reception conditions for the certain user equipment; and wherein said determining whether or not to adjust delaying includes:

comparing said estimated outgoing rate to a minimum required rate for data to the certain user equipment; and determining to delay arrival at the base station of at least one data packet destined for the certain user equipment if a result of said comparing is indicative that said estimated outgoing rate is less than said minimum required rate.

25. The method of example 21, wherein said parameter is estimated after an interval, and said parameter is indicative of base station queuing time, and wherein said determining includes:

comparing said estimated parameter to a length of said interval, or comparing parameters estimated for respective user equipments in said plurality to said length; and determining to not delay or to stop delaying arrival at the base station of at least one data packet if a result of said comparing is indicative that base station queuing time is too short.

26. The method of example 21, wherein said parameter is indicative of base station queuing time and wherein said determining includes:

comparing said estimated parameter to a maximum desired base station queuing time or comparing parameters estimated for respective user equipments in said plurality to said maximum desired base station queuing time; and determining to delay arrival at the base station of at least one data packet if a result of said comparing is indicative that base station queuing time is too long.

27. The method of example 21, wherein said parameter is a round trip time, an adjusted round trip time, an average round trip time, or an average adjusted round trip time.

28. The method of example 21, wherein said determining includes: determining to adjust delaying arrival at the base station of at least one data packet if said parameter is not steady.

29. The method of example 21, wherein said parameter is indicative of data packets being provided by the base station to more than one of said plurality of user equipments which compete for service, and wherein said determining includes: determining to delay arrival at the base station of data packets destined for any but one of said plurality of user equipments.

30. The method of example 21, wherein said determining includes: determining whether or not to adjust delaying of a certain data packet at least partly based on data packet type.

31. The method of example 30, wherein whether or not to adjust delaying is at least partly based on whether or not said data packet type is a data packet type for which a high quality of user experience is at least partly dependent on a constant rate to an associated user equipment.

32. The method of example 21, wherein said determining includes: determining whether or not to adjust delaying of a certain data packet at least partly based on to which user equipment said data packet is destined.

33. The method of example 21, wherein estimating is performed a plurality of times and wherein said determining is at least partly based on at least one parameter estimated during at least one of said plurality of times.

34. A system for affecting data in a wireless network, comprising:

a delay evaluator configured to estimate a parameter indicative of service by a base station to any one of a plurality of user equipments or to said plurality of user equipments; and to at least partly based on said estimated parameter, determine whether or not to adjust delaying of arrival at the base station of at least one data packet; and a delayer configured, if determined to adjust delaying, to adjust delaying of arrival of said at least one data packet.

35. The system of example 34, further comprising: a noter configured to note times associated with data packets, wherein estimation of a parameter is at least partly based on one or more of said noted times.

36. The system of example 35, wherein said noter is further configured to note sequence numbers associated with data packets, wherein estimation of a parameter is at least partly based on one or more of said noted sequence numbers.

37. The system of example 34, further comprising: a recognizer configured to recognize at least one selected from a group comprising: user equipments for which respective data packets are destined, one or more groups served by one or more wireless transmitters associated with user equipments for which respective data packets are destined, or types of respective data packets.

38. The system of example 34, further comprising at least one data packet queue.

39. The system of example 34, wherein at least part of said system is located in the wireless network between a packet data network and one or more base stations.

40. A computer program product comprising a computer useable medium having computer readable code embodied therein for affecting data in a wireless network, the computer program product comprising:

computer readable program code for causing a computer to estimate a parameter indicative of service by a base station to any one of a plurality of user equipments or to said plurality of user equipments;

computer readable program code for causing a computer to, at least partly based on said estimated parameter, determine whether or not to adjust delaying arrival at the base station of at least one data packet; and computer readable program code for causing a computer to, if determined to adjust delaying, to adjusting delaying of arrival of said at least one data packet.

41. The method of example 21, wherein said determining is at least partly based on quality of experience considerations.

42. The system of example 34, wherein said determining is at least partly based on quality of experience considerations.

43. The computer program product of example 40, wherein said determining is at least partly based on quality of experience considerations.

44. A method of supervising data in a wireless network, comprising:

noting times associated with data packets en route between a packet data network and a base station;

at least partly based on one or more of said noted times, evaluating the service provided by the base station;

at least partly based on a result of said evaluating, determining whether or not at least one action should be performed; and if determined that any action should be performed, performing at least one action.

45. The method of example 44, wherein said evaluating includes: estimating at least one parameter at least partly based on one or more of said noted times.

46. The method of example 45, wherein at least one of said at least one parameter is indicative of base station queuing time.

47. The method of example 45, wherein at least one of said at least one parameter is a round trip time or adjusted round trip time.

48. The method of example 45, wherein at least one of said at least one parameter is a base station outgoing rate.

49. A system for supervising data in a wireless network, comprising:

a noter configured to note times associated with data packets en route between a packet data network and a base station;

an evaluator configured, at least partly based on one or more of said noted times, to evaluate the service provided by the base station, and configured, at least partly based on a result of said evaluating, to determine whether or not at least one action should be performed; and an action performer delayer configured, if determined that any action should be performed, to perform at least one action.

50. The system of example 49, further comprising: a data structure in which said noter is configured to store times associated with data packets.

51. The system of example 49, further comprising: a recognizer configured to recognize characteristics of data packets.

52. The system of example 49, further comprising: a handler configured to intercept and forward data packets.

53. The system of example 49, wherein at least part of said system is located in the wireless network between a packet data network and one or more base stations.

54. A computer program product comprising a computer useable medium having computer readable code embodied therein for supervising data in a wireless network, the computer program product comprising:

computer readable program code for causing a computer to note times associated with data packets en route between a packet data network and a base station;

computer readable program code for causing a computer, at least partly based on one or more of said noted times, to evaluate the service provided by the base station;

computer readable program code for causing a computer, at least partly based on a result of said evaluating, to determine whether or not at least one action should be performed; and computer readable program code for causing a computer, if determined that any action should be performed, to perform at least one action.

55. The method of example 44, wherein at least one of said at least one action is performed in order to reduce the fullness of at least one queue in the base station.

56. The system of example 49, wherein at least one of said at least one action is performed in order to reduce the fullness of at least one queue in the base station.

57. The computer program product of example 54, wherein at least one of said at least one action is performed in order to reduce the fullness of at least one queue in the base station.

58. A method of reducing a time period for a packet to travel to a respective user equipment in a wireless network comprising:

estimating a parameter indicative of service by a base station;

at least partly based on said estimated parameter, determining whether or not to delay arrival at the base station of at least one other data packet so as to reduce the time period for the packet to travel to the respective user equipment ; and if determined to delay, delaying of arrival of the at least one other data packet.

59. The method of example 58, wherein said parameter is indicative of base station queuing time and wherein said determining includes:

comparing one or more estimated parameters to a maximum desired queuing time; and determining to delay arrival at the base station of the at least one other data packet result of said comparing is indicative that base station queuing time is too long.

60. The method of example 58, wherein said parameter is a round trip time, an adjusted round trip time, an average round trip time, or an average adjusted round trip time.

61. The method of example 58, wherein said determining includes: determining whether or not to delay arrival of a certain data packet at least partly based on data packet type.

62. The method of example 61, wherein whether or not to delay is at least partly based on whether or not said data packet type is a data packet type for which a high quality of user experience is at least partly dependent on a constant rate to an associated user equipment.

63. The method of example 58 wherein said determining includes: determining whether or not to delay arrival of a certain data packet at least partly based on to which user equipment said data packet is destined.

64. The method of example 58, wherein estimating is performed a plurality of times and wherein said determining is at least partly based on at least one parameter estimated during at least one of said plurality of times.

65. The method of example 58, wherein said estimated parameter relates to one user equipment or to a plurality of user equipments.

66. The method of example 58, further comprising: noting times associated with data packets, wherein said estimating of a parameter is at least partly based on one or more of said noted times.

67. A system for reducing a time period for a packet to travel to a respective user equipment in a wireless network comprising:

a delay evaluator configured to estimate a parameter indicative of service by a base station; and to at least partly based on said estimated parameter, determine whether or not to delay arrival at the base station of at least one other data packet so as to reduce the time period for the packet to travel to the respective user equipment ; and a delayer configured, if determined to delay, to delay arrival of the at least one other data packet.

68. The system of example 67, further comprising: a noter configured to note times associated with data packets, wherein estimation of a parameter is at least partly based on one or more of said noted times.

69. The system of example 68, wherein said rioter is further configured to note sequence numbers associated with data packets, wherein estimation of a parameter is at least partly based on one or more of said noted sequence numbers.

70. The system of example 67, further comprising: a recognizer configured to recognize at least one selected from a group comprising: user equipments for which respective data packets are destined, one or more groups served by one or more wireless transmitters associated with user equipments for which respective data packets are destined, or types of respective data packets.

71. The system of example 67, further comprising at east one data packet queue.

72. The system of example 67, wherein at least part of said system is located in the wireless network between a packet data network and one or more base stations.

73. A computer program product comprising a computer useable medium having computer readable code embodied therein for reducing a time period for a packet to travel to a respective user equipment in a wireless network, the computer program product comprising:

computer readable program code for causing a computer to estimate a parameter indicative of service by a base station;

computer readable program code for causing a computer to, at least partly based on said estimated parameter, determine whether or not to delay arrival at the base station of at least one other data packet so as to reduce the time period for the packet to travel to the respective user equipment; and computer readable program code for causing a computer to, if determined to delay, to delay arrival of said at least one other data packet.

74. The computer program product of example 73, wherein said parameter is indicative of base station queuing time and wherein said computer readable program code for causing a computer to determine includes:

computer readable program code for causing a computer to compare one or more estimated parameters to a maximum desired queuing time; and computer readable program code for causing a computer to determine to delay arrival at the base station of the at least one other data packet if a result of said comparing is indicative that base station queuing time is too long.

75. The computer program product of example 73, wherein said parameter is a round trip time, an adjusted round trip time, an average round trip time, or an average adjusted round trip time.

76. The computer program product of example 73, further comprising: computer readable program code for causing a computer to note times associated with data packets, wherein estimation of a parameter is at least partly based on one or more of said noted times.

77. The computer program product of example 73, wherein said estimated parameter relates to one user equipment or to a plurality of user equipments.

While examples of the subject matter have been shown and described, the subject matter is not thus limited. Numerous modifications, changes and improvements within the scope of the subject matter will now occur to the reader.

The invention claimed is:

1. A method of supervising data in a wireless network, comprising:

intercepting packets en route between a node in a network and a packet data network, by a supervisor computer, separate from the node;

identifying a corresponding user equipment (UE) for each of the intercepted packets;

estimating an incoming data rate of the intercepted packets to the node for the UEs and an outgoing rate from the node to the UEs;

noting times associated with the intercepted data packets at the supervisor computer;

recognizing sets of the identified UEs serviced by corresponding nodes, responsively to the intercepted packets;

based on one or more of said noted times, the identified UEs, and responsive to the estimated incoming data rate and the outgoing rate, estimating, for each of the UEs, at least one parameter indicative of a fullness of at least one queue, of packets directed to the UE, in the node;

determining for each set, a threshold dependent on current conditions to be used for all the UEs of the set;

comparing the estimated at least one parameter of each UE to the corresponding threshold of the UE;

at least partly based on a result of said comparing, determining whether or not at least one action should be performed;

if determined that any action should be performed, performing at least one action to reduce the fullness of the at least one queue; and repeating the intercepting, estimating the incoming data rate, noting, identifying, recognizing, estimating the at least one parameter, determining, comparing, and determining whether or not at least one action should be performed, periodically.

2. The method of claim 1, wherein at least one of said at least one action is performed in order to reduce the fullness of at least one queue in the node.

3. The method of claim 1, wherein the one or more thresholds include different thresholds for different UE.

4. The method of claim 1, wherein the one or more thresholds vary over time.

5. The method of claim 1, wherein the one or more thresholds are determined responsively to types of data packets recently served by the node.

6. The method of claim 1, wherein estimating the outgoing data rate from the node to the UE comprises estimating a difference between noted sequence numbers for two different acknowledgement packets, divided by a difference between noted times of the two packets.

7. The method of claim 1, wherein estimating the outgoing data rate from the node to the UE comprises estimating a rate of intercepted data packets for the UE on their way to the node, when a function of a round trip time to the UE is steady.

8. The method of claim 1, wherein estimating the at least one parameter indicative of a fullness of at least one queue in the node comprises estimating responsive to an estimated incoming data rate to the node for the UE and responsive to acknowledgements received from the UE.

9. The method of claim 8, wherein estimating the at least one parameter indicative of a fullness of at least one queue in the node comprises adjusting the at least one parameter responsive to an adjustment parameter estimating a minimum time between when a certain data packet traveling toward the UE is intercepted and when a corresponding acknowledgement is intercepted.

* * * * *